(12) United States Patent
Yanagawa et al.

(10) Patent No.: US 10,657,392 B2
(45) Date of Patent: May 19, 2020

(54) OBJECT DETECTION DEVICE, OBJECT DETECTION METHOD, AND PROGRAM

(71) Applicant: OMRON Corporation, Kyoto (JP)

(72) Inventors: Yukiko Yanagawa, Kyoto (JP); Manabu Kawashima, Kyoto (JP)

(73) Assignee: OMRON Corporation, Kyoto (JP)

( * ) Notice: Subject to any disclaimer, the term of this patent is extended or adjusted under 35 U.S.C. 154(b) by 122 days.

(21) Appl. No.: 15/751,877

(22) PCT Filed: Dec. 6, 2016

(86) PCT No.: PCT/JP2016/086218
§ 371 (c)(1),
(2) Date: Feb. 12, 2018

(87) PCT Pub. No.: WO2017/158948
PCT Pub. Date: Sep. 21, 2017

(65) Prior Publication Data
US 2018/0232582 A1 Aug. 16, 2018

(30) Foreign Application Priority Data

Mar. 15, 2016 (JP) .................................. 2016-050939

(51) Int. Cl.
*G06K 9/00* (2006.01)
*G08G 1/16* (2006.01)
(Continued)

(52) U.S. Cl.
CPC ..... *G06K 9/00805* (2013.01); *G06K 9/00369* (2013.01); *G06K 9/4604* (2013.01);
(Continued)

(58) Field of Classification Search
None
See application file for complete search history.

(56) References Cited

U.S. PATENT DOCUMENTS

2010/0220245 A1* 9/2010 Yang ...................... G06F 3/042
348/739

FOREIGN PATENT DOCUMENTS

| JP | H10143659 | 5/1998 |
| JP | H10283461 | 10/1998 |
| JP | 2012022573 | 2/2012 |
| JP | 2012234258 | 11/2012 |

OTHER PUBLICATIONS

Office Action of Korean Counterpart Application, with English translation thereof, dated Jan. 21, 2019, pp. 1-11.
(Continued)

*Primary Examiner* — Wei Wen Yang
(74) *Attorney, Agent, or Firm* — JCIPRNET

(57) ABSTRACT

The purpose of the present invention is to improve the speed of processing related to the presence of objects, while maintaining measurement accuracy of object detection, in an object detection device. This object detection device is provided with: an output unit; a plurality of detection units; a first data generation unit; a second data generation unit; and an information processing unit. The output unit outputs measurement light. The plurality of detection units detect reflected light. The first data generation unit generates first data. The second data generation unit generates second data by extracting, from the first data, a plurality of pieces of second position information, which are pieces of first position information that correspond to representative points expressing the presence ranges of objects. The information processing unit uses the second data to execute information processing related to the presence of the objects.

11 Claims, 18 Drawing Sheets

(51) Int. Cl.
*G06K 9/46* (2006.01)
*G01S 17/931* (2020.01)
*B60W 30/09* (2012.01)
*G01S 7/48* (2006.01)
*G05D 1/02* (2020.01)

(52) U.S. Cl.
CPC .............. *G08G 1/16* (2013.01); *B60W 30/09* (2013.01); *B60W 2400/00* (2013.01); *B60W 2420/42* (2013.01); *B60W 2420/52* (2013.01); *B60W 2422/95* (2013.01); *B60W 2550/10* (2013.01); *B60W 2710/18* (2013.01); *B60W 2710/207* (2013.01); *B60W 2720/24* (2013.01); *G01S 7/4802* (2013.01); *G01S 17/931* (2020.01); *G05D 1/0242* (2013.01); *G05D 2201/0213* (2013.01); *G06K 2209/23* (2013.01); *G08G 1/166* (2013.01)

(56) References Cited

OTHER PUBLICATIONS

"International Search Report (Form PCT/ISA/210) of PCT/JP2016/086218", dated Mar. 7, 2017, with English translation thereof, pp. 1-2.
"Written Opinion of the International Searching Authority of PCT/JP2016/086218" with English translation thereof, dated Mar. 7, 2017, p. 1-p. 8.
"Search Report of Europe Counterpart Application", dated Nov. 5, 2019, p. 1-p. 9.
Roger Bostelman et al., "Obstacle Detection using a Time-of-Flight Range Camera for Automated Guided Vehicle Safety and Navigation", Integrated Computer-Aided Engineering, vol. 12, No. 3, Jun. 21, 2005, pp. 1-36.

\* cited by examiner

OBJECT DETECTION DEVICE, OBJECT DETECTION METHOD, AND PROGRAM

CROSS-REFERENCE TO RELATED APPLICATION

This application is a 371 of international application of PCT application serial no. PCT/JP2016/086218, filed on Dec. 6, 2016, which claims the priority benefit of Japanese Patent Application Laid-Open (JP-A) no. 2016-050939, filed on Mar. 15, 2016. The entirety of each of the abovementioned patent applications is hereby incorporated by reference herein and made a part of this specification.

BACKGROUND

Technical Field

The present invention relates to an object detection device that detects an object that is present in the surroundings and executes predetermined processing thereon.

Related Art

In the related art, a system that detects an obstacle around a moving body, such as a vehicle, and automatically or semi-automatically causes the moving body to move is known. An advanced driver assistance system (ADAS), such as an automatic emergency brake, instead of an operator of the moving body that causes a brake of the moving body to automatically operate in a case in which the obstacle and the moving body are approaching one another, for example, is known. The aforementioned system calculates a relative positional relationship between the moving body that is a target of control and the aforementioned obstacle by using information that is obtained from a sensor that detects the obstacle, such as an oncoming vehicle or a pedestrian, and controls the moving body on the basis of the positional relationship.

In recent years, the amount of data (the number of distance measurement points) obtained from the sensor has increased as the resolution of sensors has increased. This has led to a problem that it takes time to perform processing of determining the aforementioned positional relationship while it has become possible for the aforementioned system to more precisely measure the aforementioned positional relationship.

In order to solve this problem, it may be conceived that only necessary information is extracted from the information obtained by the sensor and is then processed. In this manner, it is possible to reduce the amount of information to be processed by the system, and as a result, it is possible to shorten the processing time for the positional relationship to be determined by the system.

As a method of extracting only the necessary information from the information obtained by the sensor, a method of thinning out image signals with low reliability, which have been determined by using corner detection or Difference of Gaussian (DoG) maxima, from among a large number of image signals obtained by an image sensor or the like as disclosed is Patent literature 1 is known.

[Patent Literature 1] Japanese Patent Application Publication No. 2012-234258

SUMMARY

In a case in which the method of thinning out the image signals as disclosed in Patent literature 1 is applied to a system that controls a moving body on the basis of a positional relationship between the moving body and an obstacle, there is a problem that the image signals may be excessively thinned out since an image obtained by the sensor is divided into a plurality of regions and the detected feature points are thinned out such that the number of feature points in each separate region is within a limited number of feature points. Therefore, the measurement accuracy of the positional relationship between the moving body and the obstacle is degraded, or in contrast, the processing by the system takes a long time to be performed as a result of processing more information than necessary if it is attempted to maintain the measurement accuracy of the positional relationship between the moving body and the obstacle.

An object of the present invention is to improve a processing speed related to the presence of an object while maintaining measurement accuracy when detecting an object in an object detection device that detects an object that is present in the surroundings and executes predetermined processing thereon.

Hereinafter, a plurality of modes as means for solving the problem will be described. These modes can be arbitrarily combined as needed.

An object detection device according to an aspect of the present invention includes: an output unit, a plurality of detection units, a first data generation unit, a second data generation unit, and an information processing unit. The output unit outputs a first signal to an object. The plurality of detection units are respectively arranged at predetermined positions on a detection surface. The plurality of detection units detect a second signal that occurs due to the first signal being reflected by the object.

The first data generation unit generates first data that is a group of a plurality of first position information items. The first position information is information in which coordinate values and signal detection information are associated, wherein the coordinate values respectively represent the arrangement positions of the detection units with first coordinates set on the detection surface. The signal detection information is information that is calculated on the basis of the second signal detected by the detection units, and includes at least distance information between the detection surface and the object.

The second data generation unit generates second data that includes a plurality of second position information items by extracting the plurality of second position information items from the first data. The second position information is the first position information corresponding to representative points that represent a presence range of the object. The information processing unit executes information processing related to presence of the object by using the second data.

In the aforementioned object detection device, the output unit outputs the first signal first. In this manner, the first signal is reflected by the object, and the second signal is then generated. The detection units respectively detect the second signal from the object. Then, the first data generation unit calculates the signal detection information that includes at least the distance information that represents the distance between the detection surface and the object on the basis of the second signal detected by the detection units. Thereafter, the first data generation unit generates the first position information by associating the coordinate values with the signal detection information, wherein the coordinate values respectively represent the arrangement positions of the detection units with the first coordinates set on the detection surface, and the signal detection information are calculated for the detection units. After the first position information is generated for all the plurality of detection units, the first data generation unit generates a group of a plurality of first position information items as the first data.

After the first data is generated, the second data generation unit extracts the plurality of first position information items corresponding to the representative points that represent the presence range of the object as the plurality of second position information items from the first data, and generates the second data that includes the plurality of second position information items.

After the second data is generated, the information processing unit executes the information processing related to the presence of the object by using the second data.

In the aforementioned object detection device, the second data generation unit extracts at least first position information necessary for the information processing related to the presence of the object from the first data that includes the plurality of first position information items in which the coordinate values that indicate the arrangement positions of the detection units and the signal detection information are associated, and generates the second data. That is, the second data includes at least data necessary for the information processing by the information processing unit while the amount of the second data is smaller than the amount of the first data.

In this manner, the processing speed can be improved in the information processing unit by reducing the amount of calculation necessary for the processing related to the presence of the object while maintaining the measurement accuracy when detecting the object.

The representative points may be points that represent a contour of the object. In this manner, the information processing unit can execute the information processing in which it is necessary to detect the shape of the object at a high speed.

The second data generation unit may extract the two first position information items that are present at both ends on the same horizontal line or vertical line on the first coordinates as the plurality of second position information items. In this manner, the second data generation unit can extract the plurality of second position information items that represent a contour of the object at a high speed without using complicated calculation.

The second data generation unit may perform, in at least one direction, processing of extracting two first position information items that are located at extreme ends in a predetermined direction on the first coordinates from the first data, and extract the first position information extracted by the processing as the second position information.

In this manner, it is possible to extract the plurality of second position information items that represent the contour in the predetermined direction without using complicated calculation.

The representative points may be points corresponding to the minimum distance between the object and the detection surface. In this manner, the information processing unit can execute the information processing for presence of an object or a part of the object that is the closest to the object detection device at a high speed.

The aforementioned object detection device may further include a third data generation unit. The third data generation unit extracts third position information from the first data and generates third data. The third position information is the first position information in which the distance information included in the signal detection information is within a predetermined range in relation to the adjacent detection units. The third data projects one object to the first coordinates. At this time, the second data generation unit extracts the third position information included in the third data as the plurality of second position information items.

In this manner, it is possible to generate the second data for each object in a case in which a plurality of objects are present in the surroundings. As a result, it is possible to execute the information processing for the presence of a plurality of objects at a high speed.

An object detection method according to another aspect of the present invention includes the following steps.

A step of outputting a first signal to an object.

A step of detecting, with a plurality of detection units that are respectively arranged at predetermined positions on a detection surface, a second signal that occurs due to the first signal being reflected by the object.

A step of generating first data that is a group of a plurality of first position information items, in each of which coordinate values and signal detection information are associated, wherein the coordinate values represent the arrangement positions of the plurality of detection units with first coordinates set on the detection surface, and the signal detection information are information calculated on the basis of the second signal detected by the detection units and include at least distance information between the detection surface and the object.

A step of generating second data that includes a plurality of second position information items by extracting the plurality of second position information items that are first position information corresponding to representative points that represent a presence range of the object from the first data.

A step of executing information processing related to presence of the object by using the second data.

In the aforementioned object detection method, at least the first position information necessary for the information processing related to the presence of the object is extracted from the first data that includes the plurality of first position information items, and the second data is generated, wherein the coordinate values that indicate the arrangement positions of the detection units and the signal detection information are associated in the first position information. In this manner, it is possible to improve the processing speed of the information processing by reducing the amount of calculation necessary for the processing related to the presence of the object while maintaining the measurement accuracy when detecting the object during the execution of the information processing.

The program according to yet another aspect of the present invention is a program that causes a computer to execute the aforementioned object detection method.

According to the aforementioned program, in an object detection device that detects an object existing in the surroundings and executes a predetermined processing, it is possible to improve the processing speed related to detection of an object while maintaining the measurement accuracy.

DETAILED DESCRIPTION OF EMBODIMENTS

Figure 1:
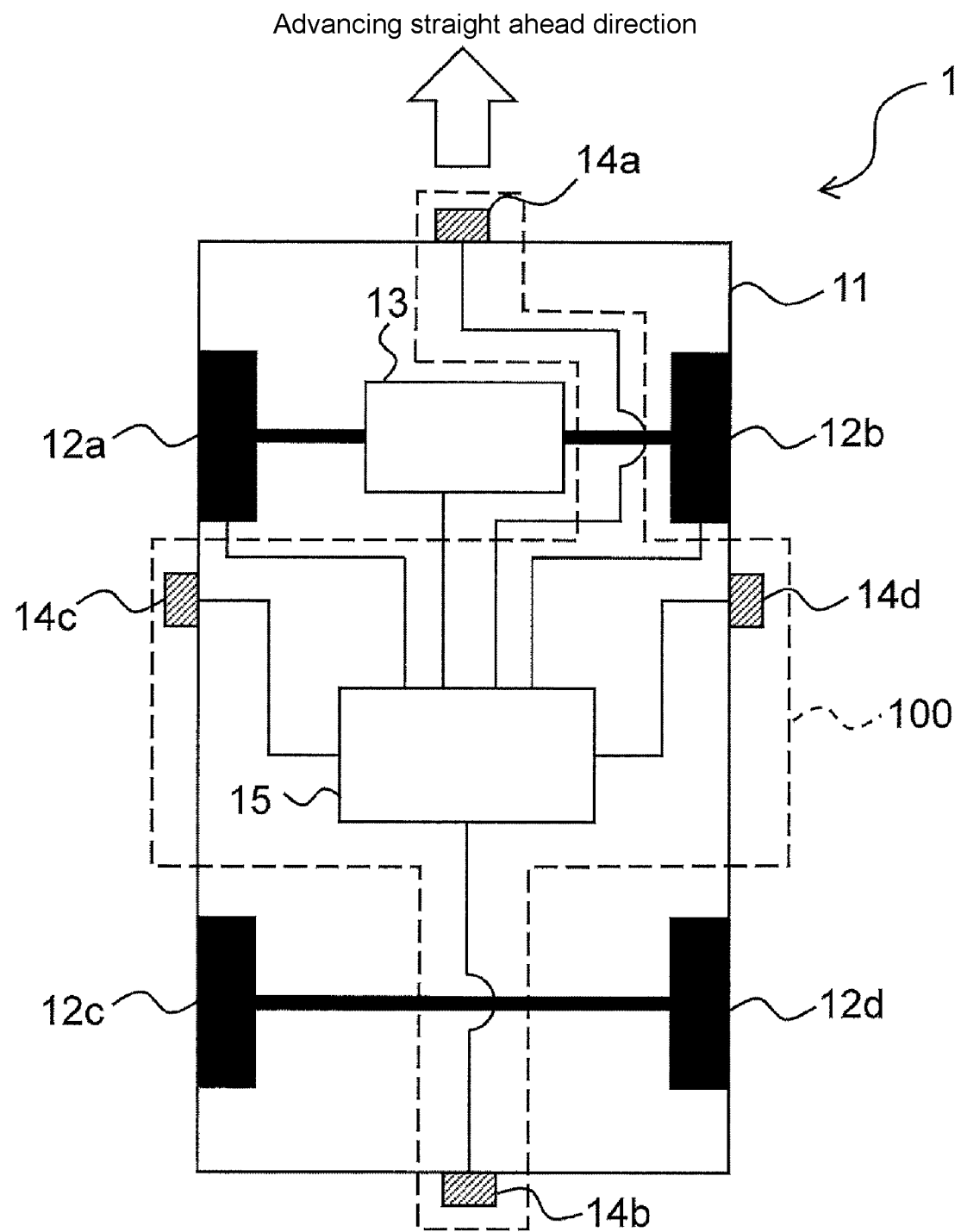
FIG. 1 is a diagram illustrating a configuration of a moving body system in which an object detection device is used.

1. First Embodiment (1) Configuration of Moving Body System in which Object Detection Device is Used Hereinafter, a configuration of a moving body system 1 in which an object detection device 100 according to a first embodiment is used will be described with reference to FIG. 1. FIG. 1 is a diagram illustrating the configuration of the moving body system in which the object detection device is used. The object detection device 100 according to the first embodiment is a device that assists operations of a moving body, such as a car, by a driver, for example.

The moving body system 1 includes a main body 11. The main body 11 forms a main body of the moving body system 1. The moving body system 1 includes wheels 12a, 12b, 12c, and 12d. The wheels 12a and 12b are attached to a front portion of the main body 11 in the advancing straight ahead direction (FIG. 1) so as to be able to rotate about an output rotation axis of a drive unit (for example, an engine and/or an electric motor) via a deceleration mechanism. Meanwhile, the wheels 12c and 12d are attached to a rear portion of the main body 11 in the advancing straight ahead direction so as to be able to rotate about an axis.

The moving body system 1 includes a moving body control unit 13. The moving body control unit 13 is a computer system that is connected to a drive mechanism of a brake provided in the wheels 12a and 12b, a drive mechanism (an accelerator or a motor control device, for example) of the drive unit, a drive mechanism of a steering wheel, and/or the like, and that can control these mechanisms. The moving body control unit 13 controls the aforementioned drive mechanisms instead of a driver of the moving body system 1 as needed on the basis of a determined positional relationship between an object O and the main body 11.

Specifically, the moving body control unit 13 determines whether or not a detected object O is present in the vicinity of the moving body system 1 (main body 11) on the basis of real space data VD (which will be described later). In a case in which it is determined that the object O is present in the vicinity of the moving body system 1, the moving body control unit 13 outputs a moving body control signal for controlling the aforementioned brake system, the drive unit, and the like to stop the moving body system 1 (main body 11).

Additionally, in a case in which it is determined that the object O is present in the vicinity of the moving body system 1, the moving body control unit 13 may output a moving body control signal for controlling the aforementioned steering system and the like to cause the moving body system 1 to avoid the object O.

The moving body system 1 includes four object detection sensors 14a, 14b, 14c, and 14d. As illustrated in FIG. 1, the object detection sensor 14a is attached to the foremost portion of the main body 11 in the advancing straight ahead direction, and detects an object that is present in front of the main body 11. The object detection sensor 14b is attached to the rearmost portion of the main body 11 in the advancing straight ahead direction, and detects an object that is present on the side to the rear of the main body 11. The object detection sensor 14c is attached to the left side surface of the main body 11 in the advancing straight ahead direction, and detects an object that is present on the left side of the main body 11. The object detection sensor 14d is attached to the right side surface of the main body 11 in the advancing straight ahead direction, and detects an object that is present on the right side of the main body 11.

In the embodiment, the object detection sensors 14a to 14d are time of flight (TOF) sensors that measure the distance to the object O that is a target of detection. However, the object detection sensors are not limited thereto, and a distance measurement sensor based on another scheme, such as a stereo camera that measures a distance from a difference between images captured by two left and right cameras or a laser range finder (LRF) may be used, for example. Configurations of the object detection sensors 14a to 14d in the embodiment will be described later in detail.

The moving body system 1 includes a control unit 15. The control unit 15 is a computer system that includes a central processing unit (CPU), a storage device (such as a random access memory (RAM), a read only memory (ROM), a solid state drive (SSD), or a hard disk drive (HDD)), and various interfaces (for example, an A/D converter, a D/A converter, and the like).

The control unit 15 inputs detection signals from the object detection sensors 14a to 14d and determines a positional relationship between the object O that is present in the surroundings and the main body 11 on the basis of the detection signals. A configuration of the control unit 15 will be described later in detail.

With the aforementioned configuration, the moving body system 1 can assist driving of the moving body system 1 by the driver on the basis of the positional relationship between the object O and the main body 11 detected by the object detection sensors 14a to 14d. In addition, the object detection sensors 14a to 14d and the control unit 15 are included in the object detection device 100 in the embodiment.

(2) Configuration of Object Detection Sensors

Figure 2:
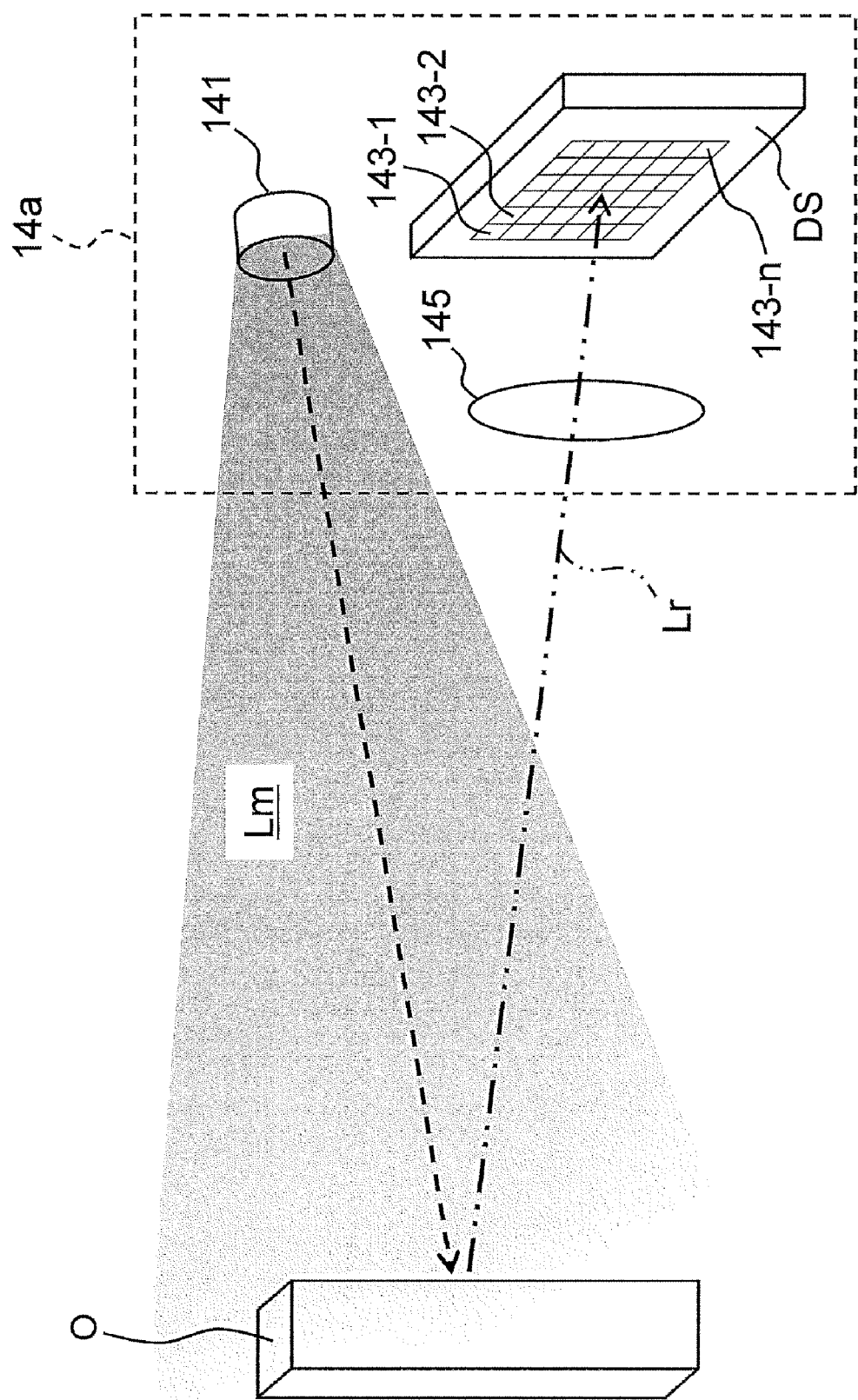
FIG. 2 is a diagram illustrating a configuration of an object detection sensor.

Next, a configuration of the object detection sensors 14a to 14d that are used in the object detection device 100 according to the embodiment will be described with reference to FIG. 2. FIG. 2 is a diagram illustrating a configuration of an object detection sensor. Since the four object detection sensors 14a to 14d have the same configuration, the following description will be given by exemplifying the configuration of the object detection sensor 14a.

The object detection sensor 14a has an output unit 141. The output unit 141 is a light source that outputs measurement light Lm (an example of the first signal) in an infrared range toward the object O that is a target of detection, for example. As illustrated in FIG. 2, the output unit 141 preferably outputs the measurement light Lm that spreads over a wide range in a space in which the moving body system 1 is moving in the embodiment. This is because the object detection sensor 14a can then detect objects O in a wide range in the space in which the moving body system 1 is moving at the same time.

The object detection sensor 14a has a plurality of detection units 143-1, 143-2, . . . , 143-n. Each of the plurality of detection units 143-1, 143-2, . . . , 143-n is arranged at a predetermined position on a detection surface DS (semiconductor substrate), for example, and detects reflected light Lr (an example of the second signal) that occurs due to the measurement light Lm being reflected by the object O. The detection units 143-1 to 143-n are charge-coupled devices or CMOS (complementary MOS) devices, for example.

In addition, the plurality of detection units 143-1 to 143-n are arranged in the up-down direction and the left-right direction on the detection surface DS and form arrays as illustrated in FIG. 2. In this manner, the plurality of detection units 143-1 to 143-n can form CCD image sensors or CMOS image sensors on the detection surface DS.

A switching element (for example, a MOS-FET) for connecting/disconnecting between the detection unit and an external control unit 15 is connected to each of the plurality of detection units 143-1 to 143-n. In addition, an address line is connected to a switching element, the switching element is turned on when a signal is applied to the address line, and a detection unit that is connected to the switching element that has been turned on and the control unit 15 can transmit and receive signals to and from each other.

The object detection sensor 14a may have a lens 145. The lens 145 collects the reflected light Lr in a region where the plurality of detection units 143-1 to 143-n are formed on the detection surface DS. In this manner, it is possible to form an image of the object O in a wide range in a region where the plurality of detection units 143-1 to 143-n are formed.

With the aforementioned configuration, the object detection sensor 14a can acquire distance data with which objects O in a wide range in the space where the moving body system 1 is moving can be projected on predetermined coordinates.

(3) Configuration of Control Unit

Figure 3:
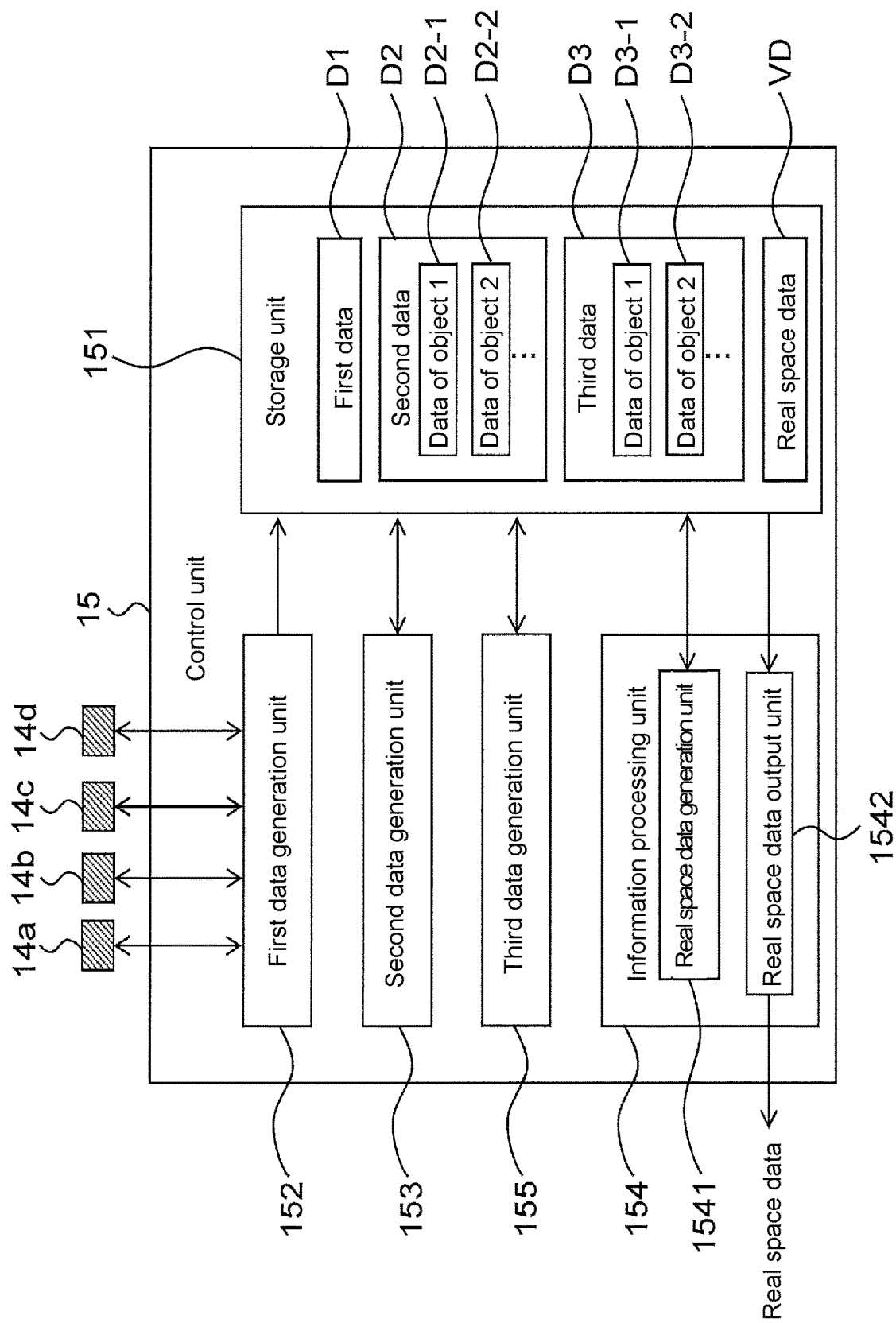
FIG. 3 is a diagram illustrating a configuration of a control unit.

Hereinafter, a configuration of the control unit 15 of the object detection device 100 according to the embodiment will be described with reference to FIG. 3. FIG. 3 is a diagram illustrating the configuration of the control unit. A part or an entirety of functions of the respective elements of the control unit 15 which will be described later may be realized by a program that can be executed by a computer system that is included in the control unit 15. At this time, the program may be stored in a storage region that is formed in a storage device of the computer system. In addition, a part or an entirety of the functions of the respective elements of the control unit 15 may be realized by hardware such as a custom IC.

The control unit 15 has a storage unit 151. The storage unit 151 is a part of the storage region provided in the storage device of the computer system, for example, that stores various kinds of data therein.

The control unit 15 has a first data generation unit 152. The first data generation unit 152 generates first data D1. The first data D1 is a group of a plurality of first position information items, in each of which coordinate values and signal detection information are associated, wherein the coordinate values represent the arrangement positions of the detection units 143-1 to 143-n on the detection surface DS with predetermined coordinates (which will be referred to as first coordinates) set on the detection surface DS. The signal detection information is information that includes at least distance information that represents the distance between the detection surface DS and the detected object O. The signal detection information is calculated on the basis of the second signal detected by the detection units 143-1 to 143-n for the respective detection units 143-1 to 143-n.

Hereinafter, a case in which the first data D1 of the object detection sensor 14a is generated will be described as an example. The first data generation unit 152 connects the first detection unit 143-1 and the first data generation unit 152 by applying a signal to an address line corresponding to the first detection unit 143-1 first, and inputs a signal (for example, a current or voltage signal) indicating whether or not the detection unit 143-1 has detected the reflected light Lr. After the signal is input, the first data generation unit 152 calculates a difference DT between a time at which the signal that indicates whether or not the reflected light Lr has been detected has input and a time at which the output unit 141 has output the measurement light Lm.

Next, the first data generation unit 152 calculates distance information d1 that represents the distance between the object O and the detection surface DS as c*DT/2 (c: speed of light) from the difference DT between the aforementioned times.

Thereafter, the first data generation unit 152 generates first position information (x, y, d). Specifically, the first data generation unit 152 can generate the first position information (x1, y1, d1) of the detection unit 143-1 by associating the coordinate values (x1, y1) with the aforementioned distance information d1, wherein the coordinate values (x1, y1) represent the arrangement position of the detection unit 143-1 with the first coordinates.

Note that the first position information may be information in which the coordinate values of the arrangement positions of the respective detection positions are associated with not only the aforementioned distance information but also the signal detection information that includes other information related to the detected second signal.

Thereafter, the first data generation unit 152 executes the aforementioned process on all the other detection units 143-2, 143-3, . . . , 143-n by sequentially changing address lines to which the signals are applied, and generates a group of n first position information items (x1, y1, d1), (x2, y2, d2), . . . , (xn, yn, dn). The group of n first position information items is stored as the first data D1 in the storage unit 151.

Note that the aforementioned coordinate values associated with the distance information d are determined in advance for each detection unit, and are determined on the basis of arrangement relationships between the respective detection units on the detection surface DS, for example. For example, y2 is equal to y1 at the coordinate values (x2, y2) assigned to the detection unit 143-2 that is adjacent to the detection unit 143-1 in the horizontal direction. Meanwhile, xm is equal to x1 at the coordinate values (xm, ym) assigned to the detection unit 143-$m$ that is adjacent to the detection unit 143-1 in the vertical direction, for example.

The control unit 15 has a second data generation unit 153. The second data generation unit 153 generates second data D2 that includes a plurality of second position information items by extracting the plurality of second position information items from the first data D1, and stores the second data D2 in the storage unit 151. The second position information is the first position information corresponding to representative points that represent a presence range of the detected object O. The second data generation unit 153 "scans" the first data D1 in the vertical direction by increasing or decreasing the y-axis direction value of the first coordinates (that is, the y-coordinate value of the first position information) by one, and extracts the first position information that meets predetermined conditions as the second position information.

In the embodiment, the representative points extracted by the second data generation unit 153 are points that represent a contour when the object O that has a three-dimensional shape is projected to the first coordinates and points that represent the distance between the object O and the detection surface DS. The representative points that represent the distance between the object O and the detection surface DS may be points corresponding to the minimum distance between the object O and the detection surface DS, or a plurality of points with the shortest distance in the respective circumferential regions from among the points on the surface of the object O may be regarded as the representative points.

A position information extracting method performed by the second data generation unit 153 according to the embodiment will be described later in detail.

The control unit 15 has an information processing unit 154. The information processing unit 154 executes the information processing related to the presence of the object O by using the second data D2 that is generated by the second data generation unit 153 and stored in the storage unit 151.

Specifically, the information processing unit 154 has a real space data generation unit 1541. The real space data generation unit 1541 generates real space data VD that represents an arrangement position of the detected object O in a real space in which the moving body system 1 is moving from the second data D2.

The information processing unit 154 has a real space data output unit 1542. The real space data output unit 1542 outputs the real space data VD to the moving body control unit 13.

With the aforementioned configuration, the control unit 15 can generate the second data D2 and provide the second data D2 to the information processing unit 154. Since the second data D2 includes the minimum necessary data (coordinate values) for the information processing to be performed by the moving body control unit 13, the amount of data to be processed by the information processing unit 154 and the moving body control unit 13 becomes small, and it is thus possible to improve the processing speed of the information processing related to the presence of the object O.

The control unit 15 may have a third data generation unit 155. The third data generation unit 155 extracts third position information from the first data D1, and generates third data D3 with which one object O is projected to the first coordinates. The third position information is first position information, of a location at a close distance on the first coordinates, and further, in which the distance information d included in the signal detection information of the first position information corresponding to adjacent detection units is similar.

Specifically, the third data generation unit 155 generates the third data D3 by extracting (the processing will be referred to as "clustering" in some cases) a group of the first position information items as the third position information, wherein in the group of the first position information items the differences in distance included in the signal detection information of the first position information within a predetermined range in comparison with the first position information that is present at a predetermined distance on the first coordinates from among the first position information items included in the first data D1.

A plurality of different objects O can be split by clustering by the processing performed by the third data generation unit 155, and as a result, a plurality of third data items D3 are obtained.

Figure 4:
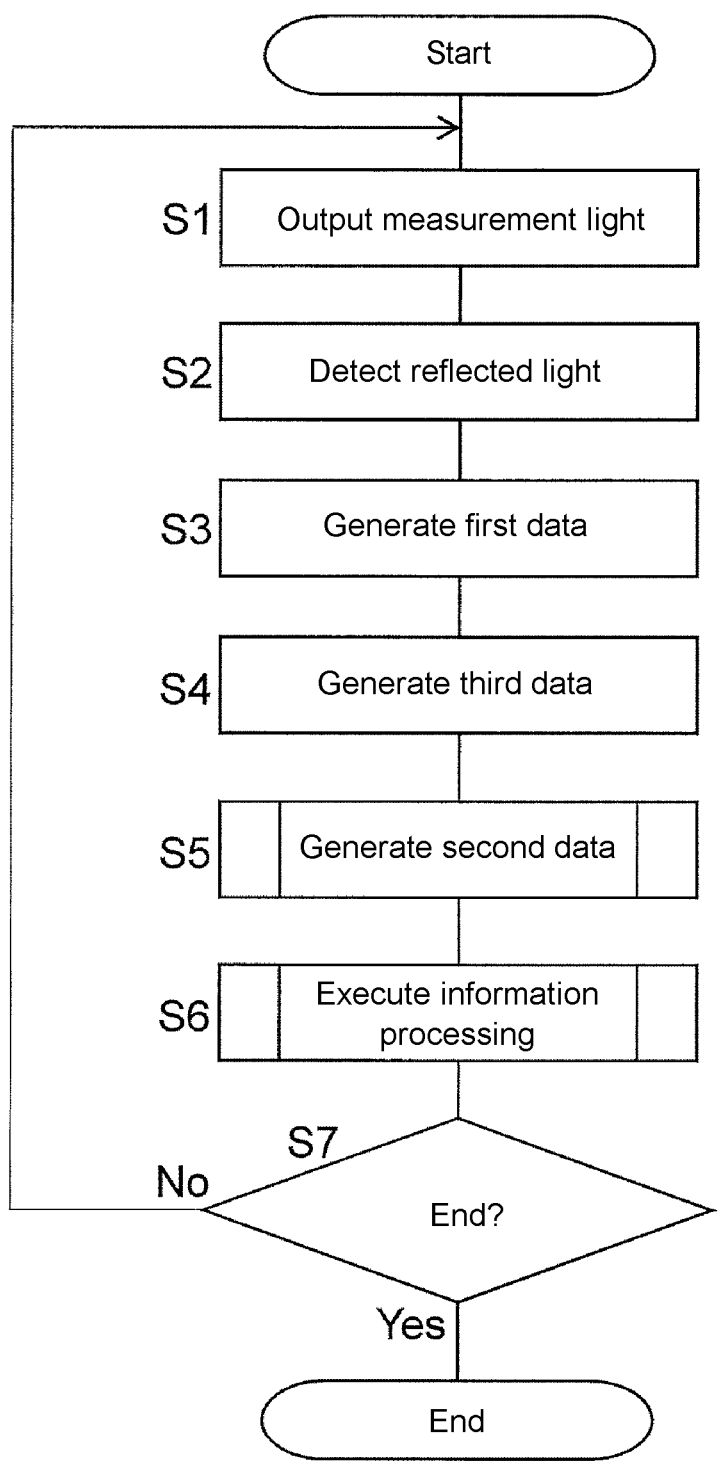
FIG. 4 is a flowchart illustrating overall operations of the object detection device.

(4) Operations of Object Detection Device
(4-1) Overall Operations of Object Detection Device Hereinafter, operations of the object detection device 100 provided in the moving body system 1 will be described. First, overall operations of the object detection device 100 will be described with reference to FIG. 4. FIG. 4 is a flowchart illustrating overall operations of the object detection device.

The first data generation unit 152 provides a command for outputting the measurement light Lm to the output units 141 of the object detection sensors 14$a$ to 14$d$ at a predetermined time interval while the moving body system 1 moves in the real space (Step S1).

Figure 5A:
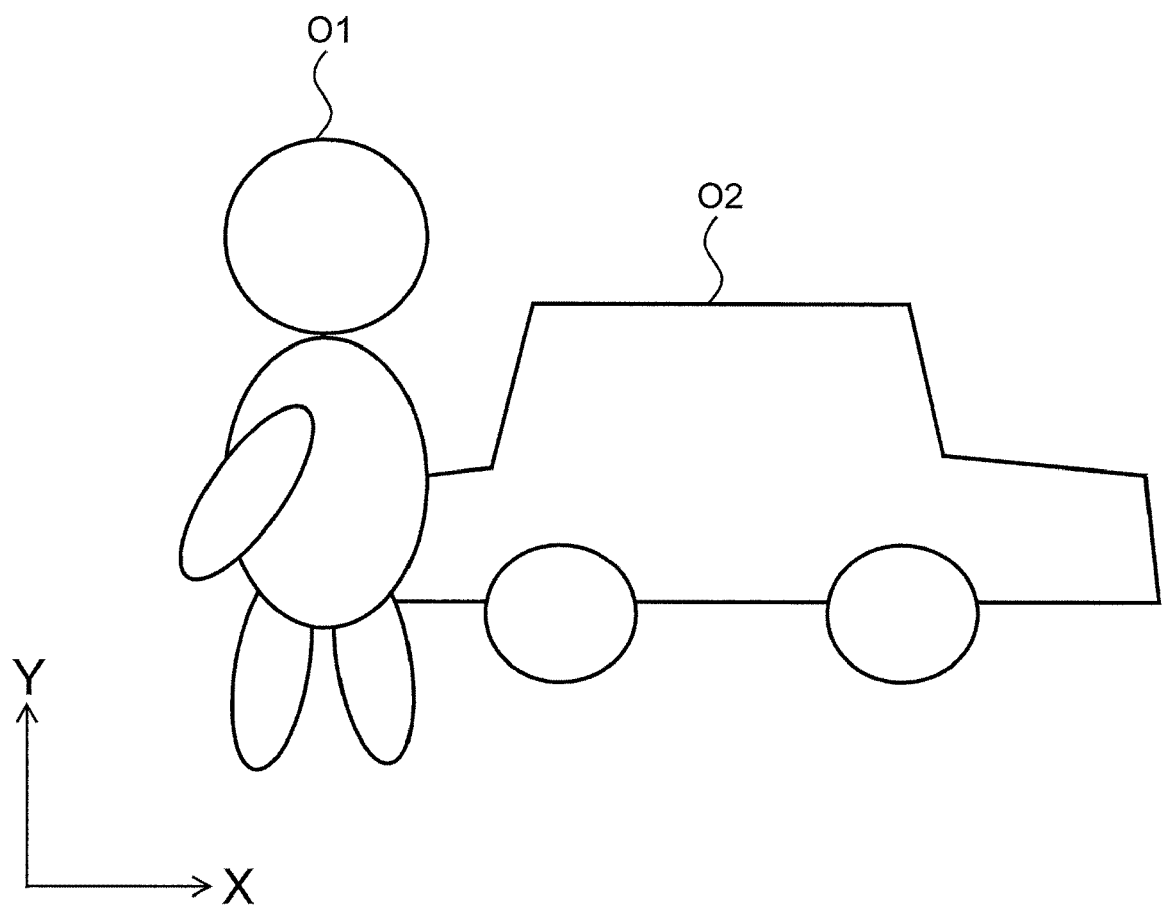
FIG. 5A is a diagram illustrating an example of an object that is present in front of the moving body system.

It is assumed that an object O1 (an object with a human shape) and an object O2 (an object with a car shape) as illustrated in FIG. 5A are present in front of the moving body system 1 in the advancing straight ahead direction at the moment when the measurement light Lm is output. FIG. 5A is a diagram illustrating an example of objects that are present in front of the moving body system.

Figure 5B:
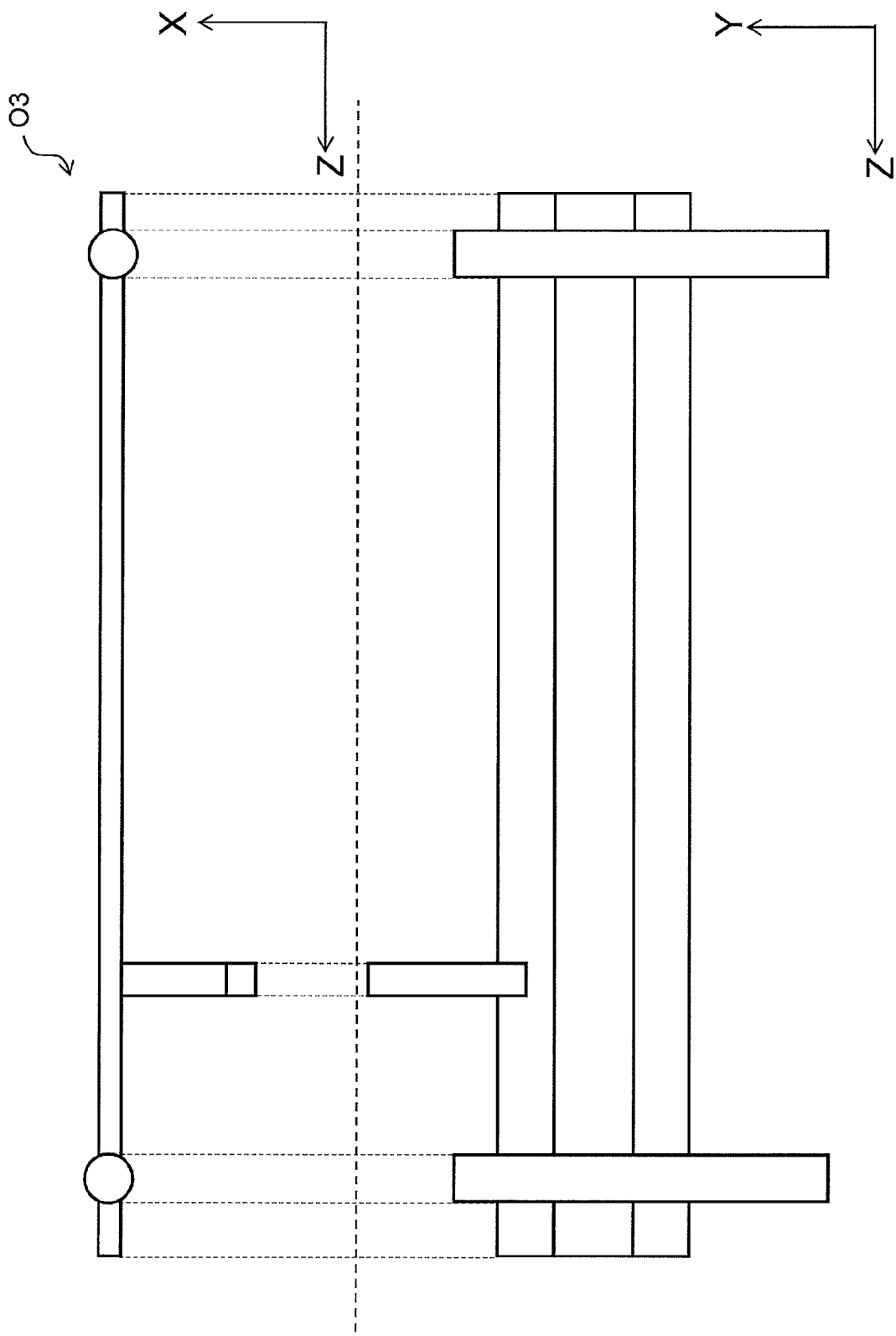
FIG. 5B is a diagram illustrating an example of an object that is present on the right side of the moving body system.

Meanwhile, it is assumed that an object O3 (an object with a guardrail shape to which a sign is attached) as illustrated in FIG. 5B is present on the right side of the moving body system 1 in the advancing straight ahead direction. FIG. 5B is a diagram illustrating an example of an object that is present on the right side of the moving body system. In FIG. 5B, the diagram illustrated above the lateral dotted line is an upper view of the object O3 while the diagram illustrated below the lateral dotted line is a front view of the object O3. As illustrated in FIG. 5B, the sign is attached in a state of sticking out from the guardrail toward the side on which the moving body system 1 is traveling.

The first data generation unit 152 sequentially applies signals to address lines corresponding to the respective detection units of the object detection sensors 14$a$ to 14$d$ at substantially the same time as the output of the measurement light Lm, and inputs signals indicating whether or not the reflected light Lr has been detected in the respective detection units (Step S2). Thereafter, the first data generation unit 152 generates the first data D1 for the respective object detection sensors 14$a$ to 14$d$ by the aforementioned method (Step S3).

Figure 6A:
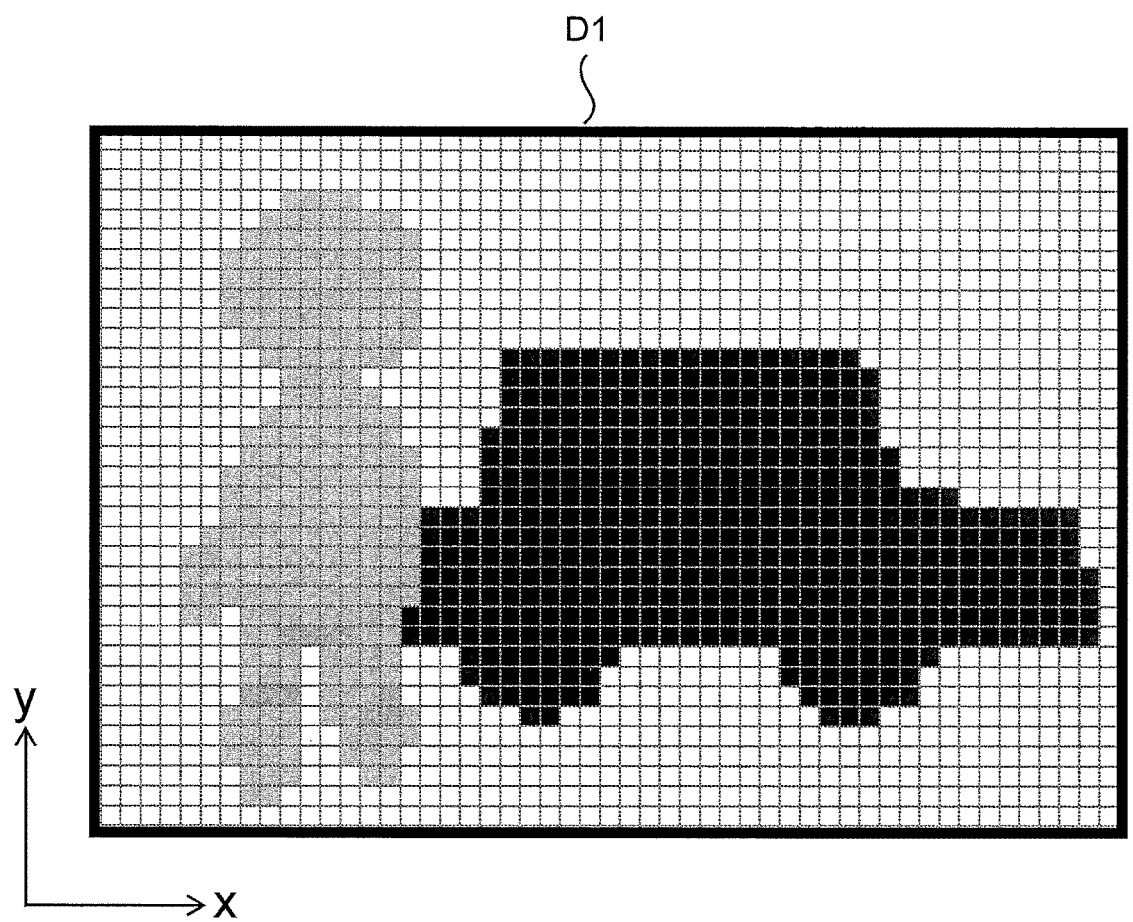
FIG. 6A is a diagram illustrating an example of first data (Example 1)
Figure 6B:
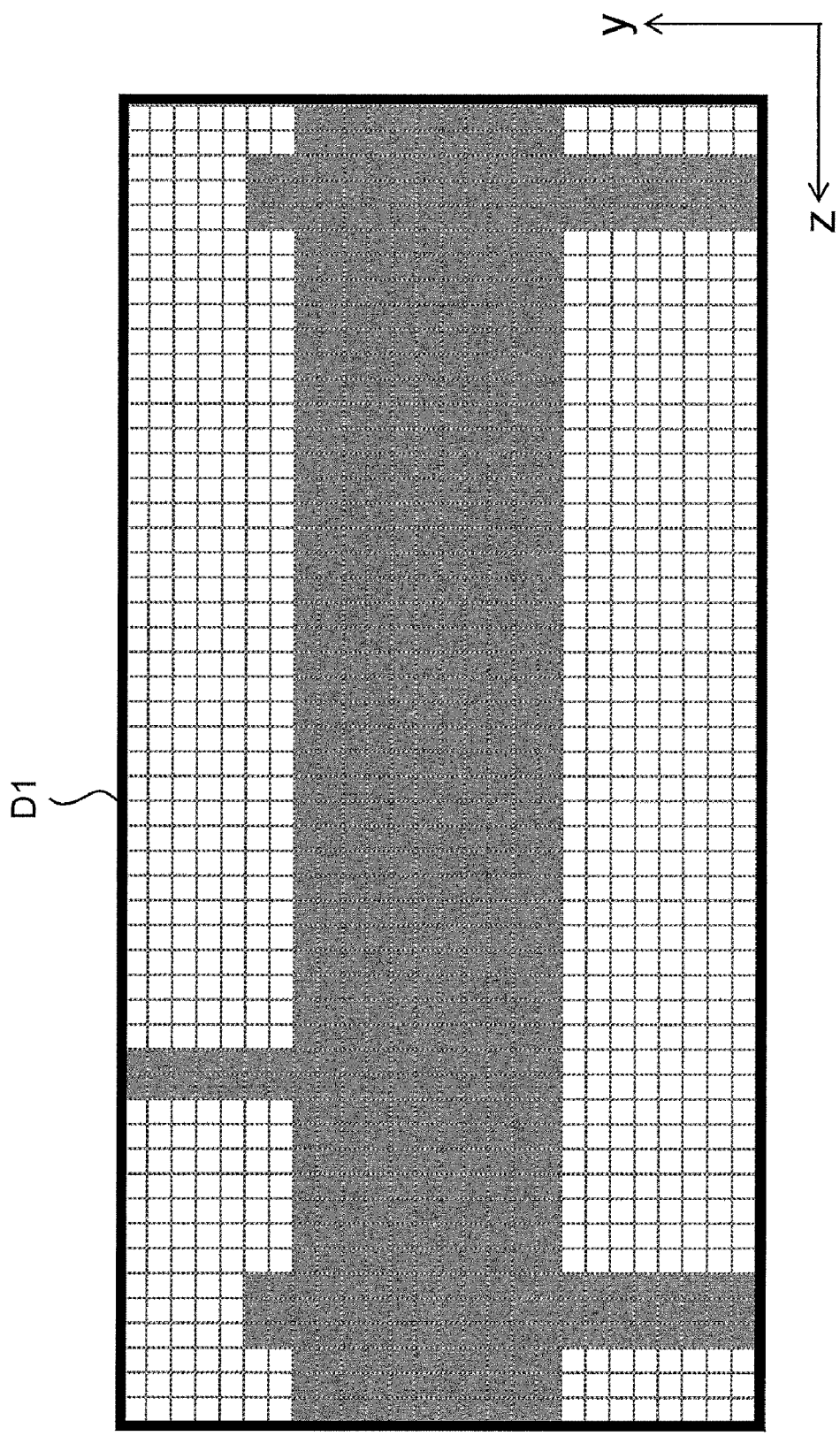
FIG. 6B is a diagram illustrating an example of the first data (Example 2)

The first data D1 as illustrated in FIG. 6A is obtained for the object detection sensor 14$a$ by executing the aforementioned Steps S1 to S3. Meanwhile, the first data D1 as illustrated in FIG. 6B is obtained for the object detection sensor 14d. FIGS. 6A and 6B are diagrams illustrating examples of the first data.

Each grid square of the first data D1 illustrated in FIGS. 6A and 6B corresponds to a detection unit arranged on the detection surface DS and corresponds to respective coordinate values on the first coordinates (the x-y coordinates in the case of FIG. 6A and the z-y coordinates in the case of FIG. 6B). The tone of the color applied to the grid squares of the first data D1 illustrated in FIGS. 6A and 6B represents how large the distance values included in the signal detection information that has been detected by the respective detection units are.

For example, a grid square represented with a light color in FIG. 6A represents that the distance is in the vicinity of d1', and a grid square represented with a dark color represents that the distance is in the vicinity of d2' (d2'>d1'). Although a grid square represented with the color that is the closest to the white color that is the lightest color means the shortest distance, it is assumed that this indicates that the distance value for this grid square included in the signal detection information that has been detected by the respective detection units is infinite (that is, the object O is not present) for convenience of expression in the drawings.

As illustrated in FIGS. 6A and 6B, the first data D1 projects (the shape of) the object O detected by the plurality of detection units 143-1 to 143-n on the first coordinates, and each grid square of the first data D1 is associated with how large the value of the signal detection information (distance information d) is.

It is possible to state that the first data D1 is a "distance image" of the object O since how large the value of the signal detection information is corresponds to how far the distance between the object O and the detection surface DS is.

After the first data D1 is generated, the third data generation unit 155 generates the third data D3 by the aforementioned clustering processing as needed (Step S4).

Figure 7A:
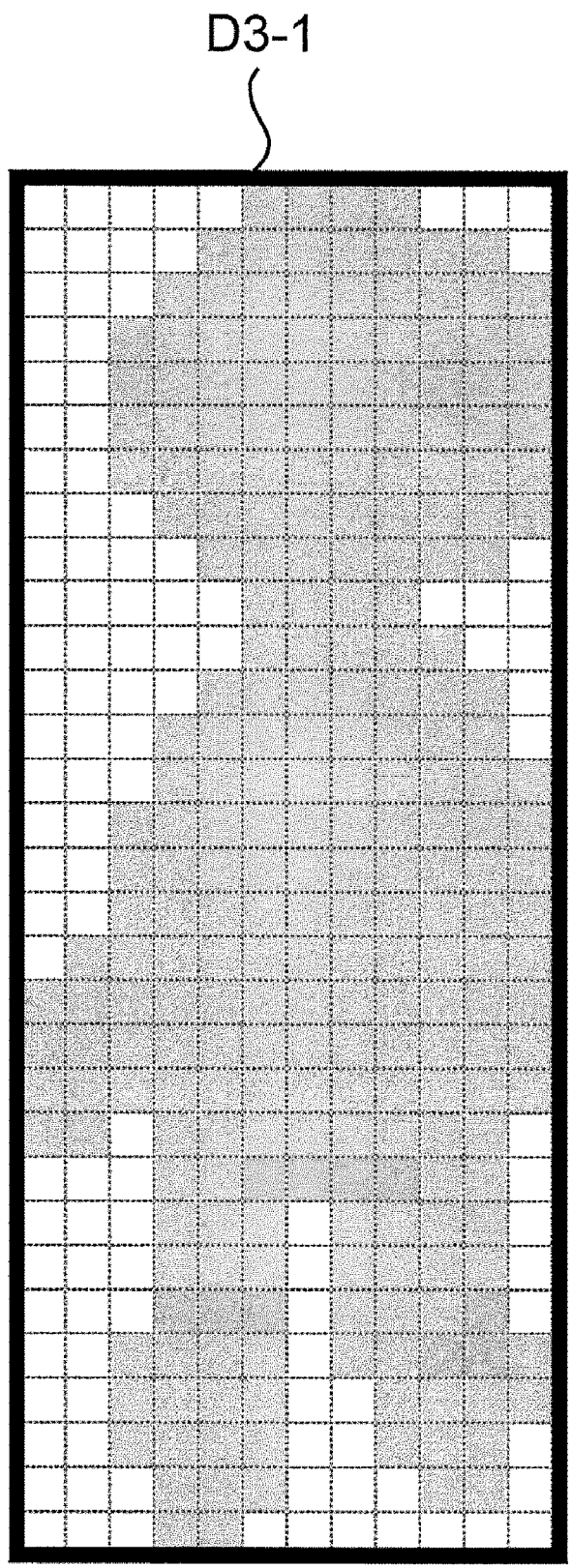
FIG. 7A is a diagram illustrating an example of third data (Example 1)

In the example illustrated in FIG. 6A, the third data generation unit 155 obtains the third data D3-1 in which a human shape is projected to the first coordinates (x-y coordinates) as illustrated in FIG. 7A by extracting, as a plurality of third position information items, a group of first position information items, which are located at a close distance on the first coordinates, and further, the signal detection information of which includes the distance in the vicinity of d1'.

Figure 7B:
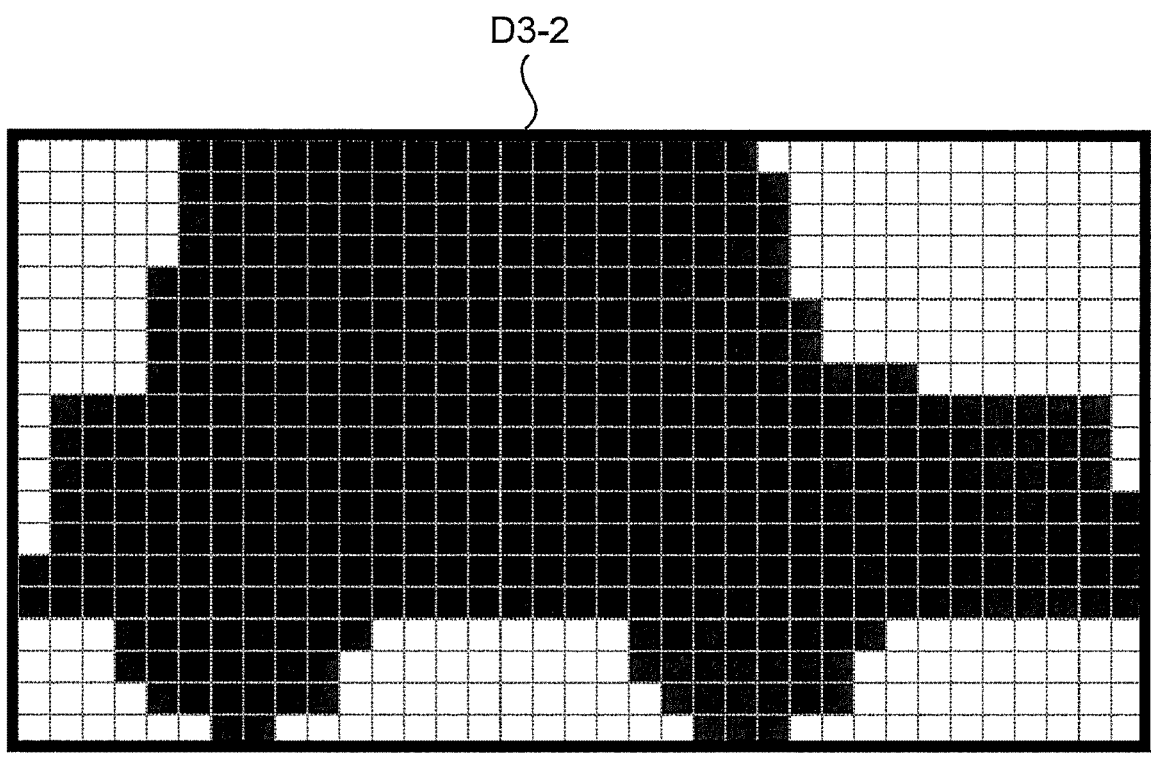
FIG. 7B is a diagram illustrating an example of the third data (Example 2).

Meanwhile, the third data generation unit 155 obtains third data D3-2 in which the car shape is projected to the first coordinates (x-y coordinates) as illustrated in FIG. 7B by extracting, as the plurality of third position information items, a group of first position information items which are located at close distances on the first coordinates, and further, the signal detection information of which includes distances in the vicinity of d2'. FIGS. 7A and 7B are diagrams illustrating examples of the third data.

No first position information is present in the grid square represented with the white color in FIGS. 7A and 7B. That is, it is possible to state that the third data D3 is data from which the shape of the extracted object O has been "cut out".

The third data generation unit 155 can generate the second data D2 for each object O in a case in which a plurality of objects O are present in the surroundings of the moving body system 1 by extracting, as the third position information, the first position information of a location at a close distance on the first coordinates, the signal detection information of which includes distances within a predetermined range and generating the third data D3.

After the third data D3 is generated, the second data generation unit 153 generates the second data D2 by extracting, as the second position information, the first position information that is representative points (the contour and the minimum points of the object) that represent the presence ranges of the detected respective objects O1, O2, and O3 from the third data D3 or the first data D1 (Step S5). A method of generating the second data D2 (extracting the second position information) in Step S5 will be described later in detail.

In a case in which the aforementioned Step S4 has been executed, and the plurality of third data items D3 have been generated, the generation of the second data D2 may be performed for all the plurality of generated third data items D3, or third data D3 for which the second data D2 is to be generated may be selected on the basis of the shape or the like of the object O indicated by the third data D3.

In a case in which the generation of the second data D2 has been executed for the plurality of third data items D3, a plurality of second data items D2-1, D2-2, . . . are generated.

After the second data D2 is generated, the information processing unit 154 executes the information processing related to the presence of the objects O1, O2, and O3 by using the second data D2 that has been generated in Step S5 (Step S6). The information processing in Step S6 according to the embodiment will be described later in detail.

The amount of data becomes smaller than that of the first data D1 due to the aforementioned Steps S1 to S5 being executed while the second position information included in the second data D2 can be restricted to at least information that is necessary for the information processing performed by the information processing unit 154.

The processing speed of the information processing in the information processing unit 154 can be improved due to reducing the amount of calculation necessary for the processing related to the presence of the objects O1, O2, and O3 while maintaining the measurement accuracy when detecting the objects O1, O2, and O3 in Step S6 by executing the information processing by using such second data D2.

After the information processing is ended, the control unit 15 determines whether or not to end the operations of the object detection device 100 (Step S7). In a case in which the user has provided a command for ending the operations of the object detection device 100 (in a case of "Yes" in Step S7), for example, the control unit 15 stops the operations of the object detection device 100.

Meanwhile, in a case in which the user has not provided the command for ending the operations (in a case of "No" in Step S7), the control unit 15 continues the operations of the object detection device 100.

(4-2) Method of Generating Second Data

Figure 8:
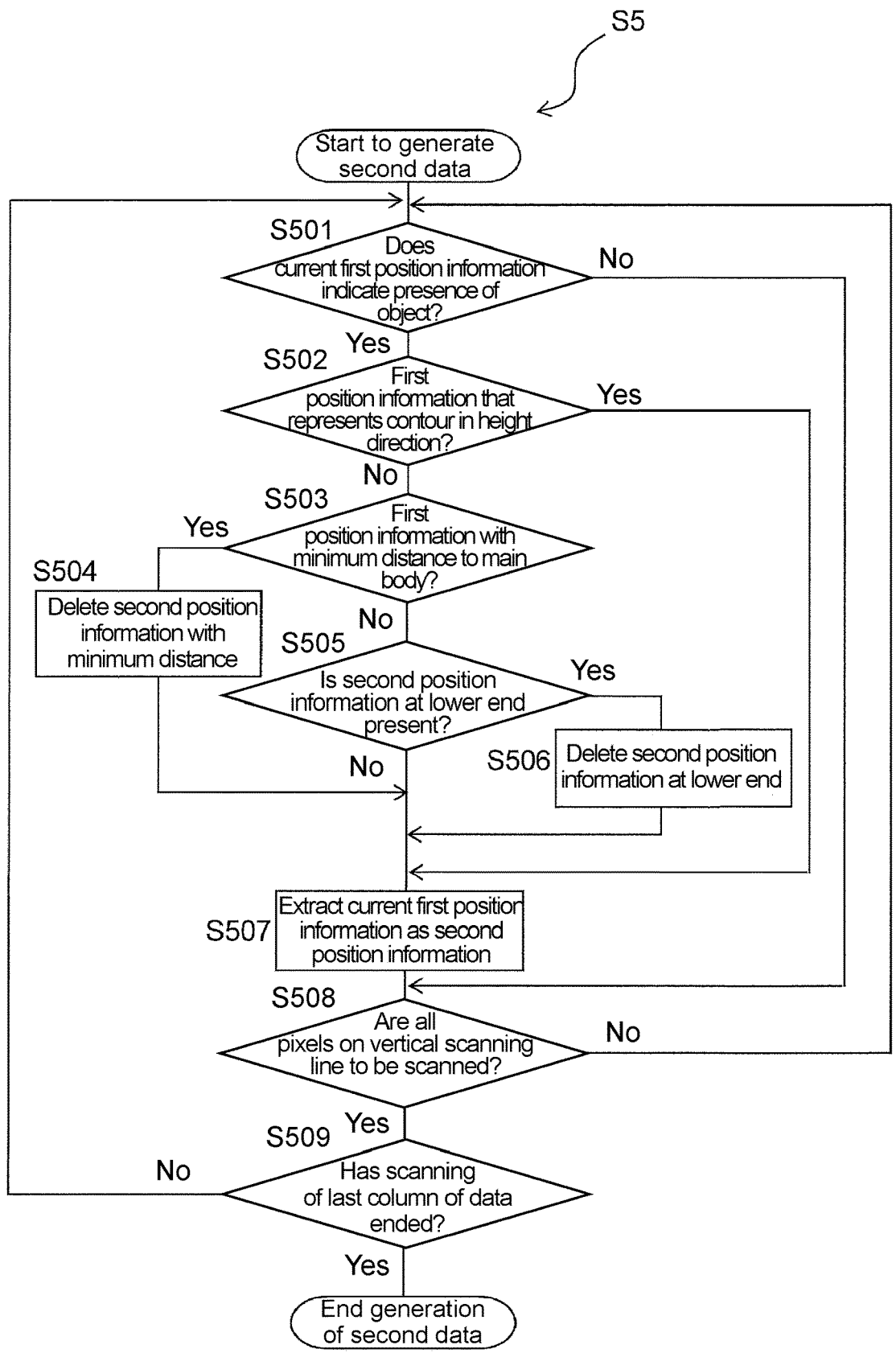
FIG. 8 is a flowchart illustrating a method of generating second data.

Next, a method of generating the second data D2 in the aforementioned Step S5 will be described with reference to FIG. 8. FIG. 8 is a flowchart illustrating a method of generating the second data. In the method of generating the second data D2 as described below, the first position information to be extracted from the first data D1 is decided by scanning the first data D1 in a direction from the larger y coordinate value to the smaller y coordinate value. Note that the scanning at the next x coordinate is performed every time the scanning of the y coordinate is ended at the first x coordinate.

If the generation of the second data D2 is started, the second data generation unit 153 refers to one first position information item included in the first data D1 first, and then determines whether or not the first position information that is currently referred indicates the presence of the object O (Step S501). In the following description, it is assumed that the first position information (which is assumed to be (xi, yj, dij)) on the i-th column and the j-th row is currently referred.

Specifically, the second data generation unit 153 determines whether or not the first position information indicates the presence of the object O depending on whether or not the signal detection information (distance information dij) associated with the first position information that is currently referred is a finite value that is equal to or less than a predetermined value.

In a case in which the signal detection information (distance information dij) is a value that is equal to or greater than the predetermined value and is close to an infinitely large number, that is, in a case in which the first position information that is currently referred indicates non-presence of the object O (in a case of "No" in Step S501), the process proceeds to Step S508 without extracting the first position information that is currently referred as the second position information.

Meanwhile, in a case in which the signal detection information (distance information dij) is a finite value that is equal to or less than the predetermined value, that is, in a case in which the first position information that is currently referred indicates the presence of the object O (in a case of "Yes" in Step S501), the second data generation unit 153 determines whether or not to extract the first position information that indicates the presence of the object O as the second position information.

In the embodiment, the second data generation unit 153 generates the second data D2 by extracting, as the second position information, the first position information that represents the contour of the object O (the contour in the vertical direction, in particular) and the first position information that represents the point (region) of the object O at which the distance to the detection surface DS is the minimum, in the first position information that indicates the presence of the object O.

Specifically, the second data generation unit 153 determines whether or not the first position information that is currently referred represents the contour in the positive direction of the y axis (the height direction of the real space) first (Step S502).

In a case in which all the first position information items referred in the past indicate the non-presence of the object O, and the first position information this time indicates the presence of the object O for the first time (in a case of "Yes" in Step S502), the second data generation unit 153 determines that the first position information that is currently referred as representing the contour in the positive direction (upper portion) of the y axis and extracts the first position information as the second position information (Step S507).

Meanwhile, in a case in which the first position information that represents the contour of the upper portion has been already found (in a case of "No" in Step S502), the second data generation unit 153 then determines whether or not the first position information that is currently referred indicates that the distance to the detection surface DS is the minimum at the present time (Step S503).

As described above, the value of the signal detection information is calculated as time until the reflected light Lr is detected by the detection units after the measurement light Lm is output. That is, the value of the signal detection information corresponds to the distance between the detection surface DS and the object O. Therefore, the second data generation unit 153 determines whether or not the distance to the detection surface DS is the minimum by determining whether or not the signal detection information (distance information dij) associated with the first position information that is currently referred is the minimum in the signal detection information (distance information di1, di2, . . . , di(j−1)) that has been referred until now.

In a case in which the signal detection information (distance information dij) indicates the minimum value in the signal detection information that is referred until now and the first position information that is currently referred indicates that the distance to the detection surface DS is the minimum at the current time (in a case of "Yes" in Step S503), the second data generation unit 153 deletes the second position information that has been extracted in the past as the first position information with the minimum distance from the detection surface DS from the second data D2 (storage unit 151) (Step S504). Thereafter, the second data generation unit 153 extracts the first position information that is currently referred as new second position information and stores the second position information in the storage unit 151 (Step S507).

Note that the second data generation unit 153 may extract, as the second position information, not only one first position information item with which the signal detection information (distance information dij) that indicates the minimum value in the y-axis direction is associated but also a plurality of first position information items with which the signal detection information (distance information dij) that indicates slightly greater values than the minimum value is associated, in Step S503.

In this manner, the second data generation unit 153 can extract, as the second position information, the plurality of first position information items that indicate the shape of the region of the object O with the minimum distance to the detection surface DS in consideration of measurement errors and the like in the object detection sensors 14a to 14d.

In addition, the second data generation unit 153 may extract, as the second position information, the first position information that is currently referred in a case in which the value of the signal detection information (distance information dij) associated with the first position information that is currently referred is extremely smaller than values (average value) of the signal detection information associated with the first position information in the surroundings, in Step S503.

In this manner, the second data generation unit 153 can extract, as the second position information, the first position information that indicates a portion sticking out from the object O toward the side of the detection surface DS instead of unevenness of the surface of the object O.

Meanwhile, in a case in which the signal detection information that indicates the minimum value is present in the signal detection information (di1, di2, . . . , di(j−1)) that have been referred until now (in a case of "No" in S503), the second data generation unit 153 does not delete the second position information that has been extracted in the past as the first position information with the minimum distance to the detection surface DS, from the second data D2.

Thereafter, the second data generation unit 153 further determines whether or not to extract the first position information that is currently referred as a contour in the negative direction (lower portion) in the y-axis direction.

Specifically, the second data generation unit 153 determines whether or not the second position information that has been extracted as the first position information that represents the contour of the lower portion is present at the present time first (Step S505).

In a case in which the second position information that represents the contour of the lower portion is further present in addition to the second position information that has the minimum distance to the detection surface DS and that represents the contour of the upper portion (in a case of "Yes" in Step S505), the second data generation unit 153 deletes the second position information from the second data D2 (Step S506) and extracts the first position information that is currently referred as the second position information that represents the contour of the lower portion (Step S507).

Meanwhile, in a case in which the second position information that represents the contour of the lower portion is not present (in a case of "No" in Step S505), the first position information that is currently referred is extracted as the second position information that represents the contour of the lower portion without deleting the second position information from the second data D2 (Step S507).

After deciding whether or not to extract the first position information that is currently referred as the second position information by executing the aforementioned Steps S501 to S507, the second data generation unit 153 determines whether or not the aforementioned Steps S501 to S507 have been executed on all the first position information items in the y axis direction that are currently scanned (Step S508).

In a case in which the plurality of detection units 143-1 to 143-n are arranged in the array form including N columns and M rows (that is, the number n of detection units=N*M), for example, it is determined that the aforementioned Steps S501 to S507 have been executed on all the first position information items in the y-axis direction if the aforementioned Steps S501 to S507 have been repeated M times in the same y-axis direction.

In a case in which the number of times the aforementioned steps are repeated is less than M, and the first position information for which whether or not to be extracted is to be decided still remains (in a case of "No" in Step S508), the second data generation unit 153 decides to make a determination about whether or not to extract the first position information (xi, y(j+1), di(j+1)) on the next row (that is, the i-th column and the j+1-th row) as the second position information, and the process returns to Step S501.

Meanwhile, in a case in which the number of times the aforementioned steps are repeated reaches M, and it has been determined whether or not to perform extraction as the second position information for all the first position information items in the y-axis direction that are currently scanned (in a case of "Yes" in Step S508), the second data generation unit 153 determines whether or not the column at which the scanning has been completed is the last column of the first data D1 (Step S509).

In a case in which the number of columns on which the scanning has been completed is less than N, and it is determined that there are remaining columns on which the scanning is to be executed (in a case of "No" in Step S509), for example, the second data generation unit 153 decides to make a determination about whether or not to extract the first position information on the next column (that is, the i+1-th column) as the second position information, and the process returns to Step S501.

Meanwhile, in a case in which the number of columns on which the scanning has been completed reaches N, and it is determined that there is no remaining column on which the scanning is to be executed (that is, Steps S501 to S507 are executed on all the first position information items included in the first data D1) (in a case of "Yes" in Step S509), the processing of generating the second data D2 ends.

Figure 9A:
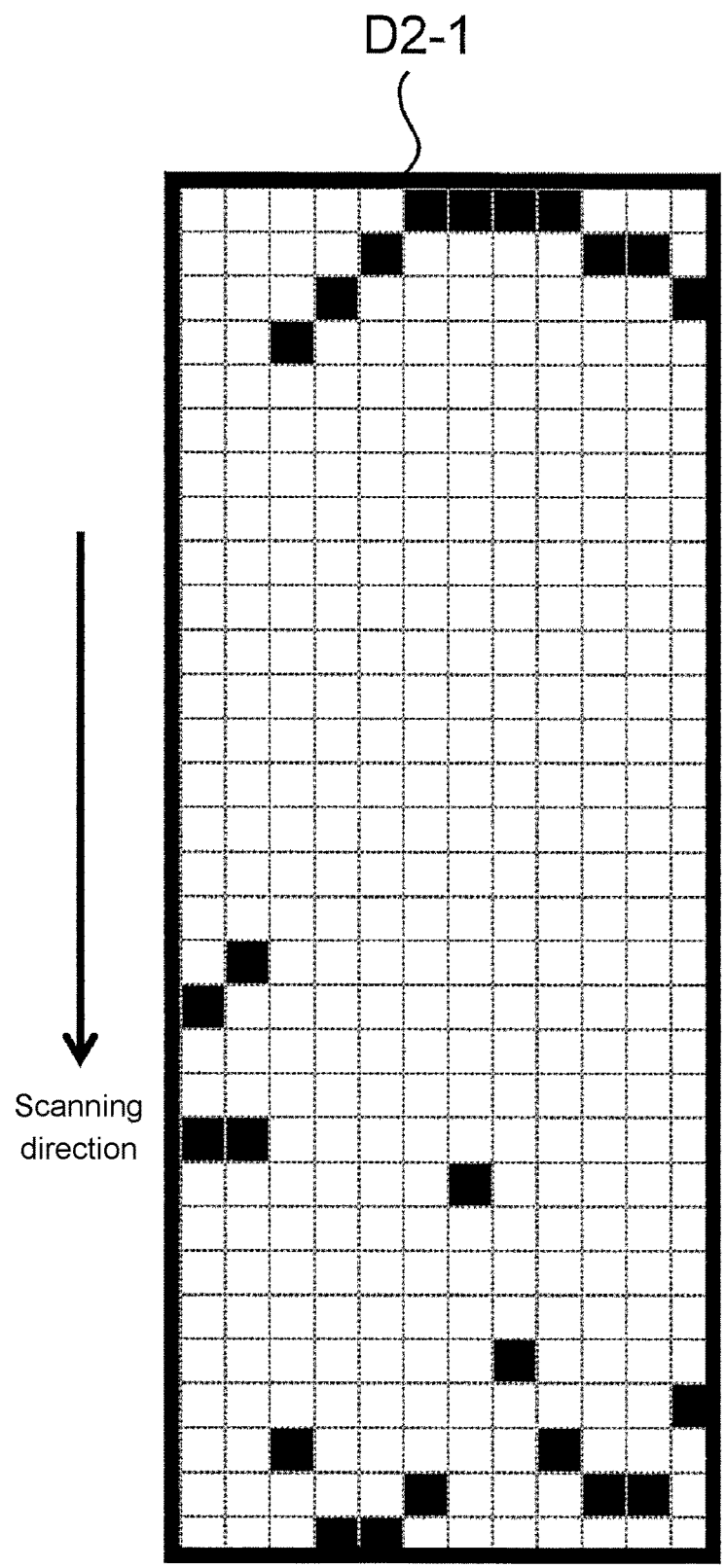
FIG. 9A is a diagram illustrating an example of second data (Example 1).
Figure 9B:
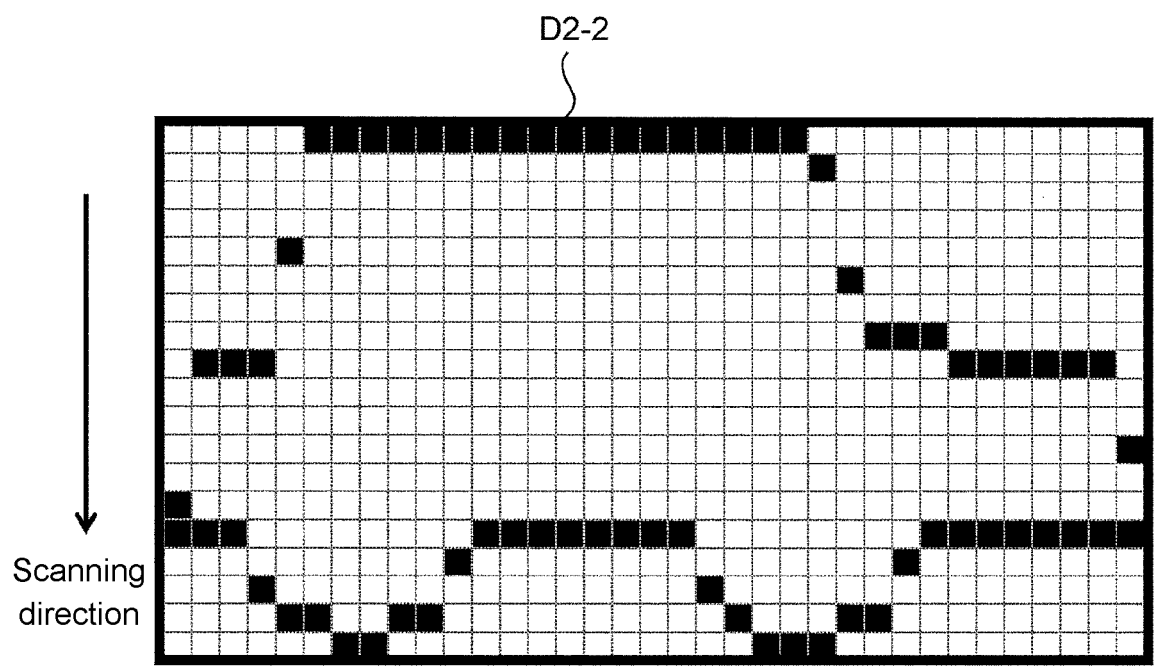
FIG. 9B is a diagram illustrating an example of the second data (Example 2).
Figure 9C:
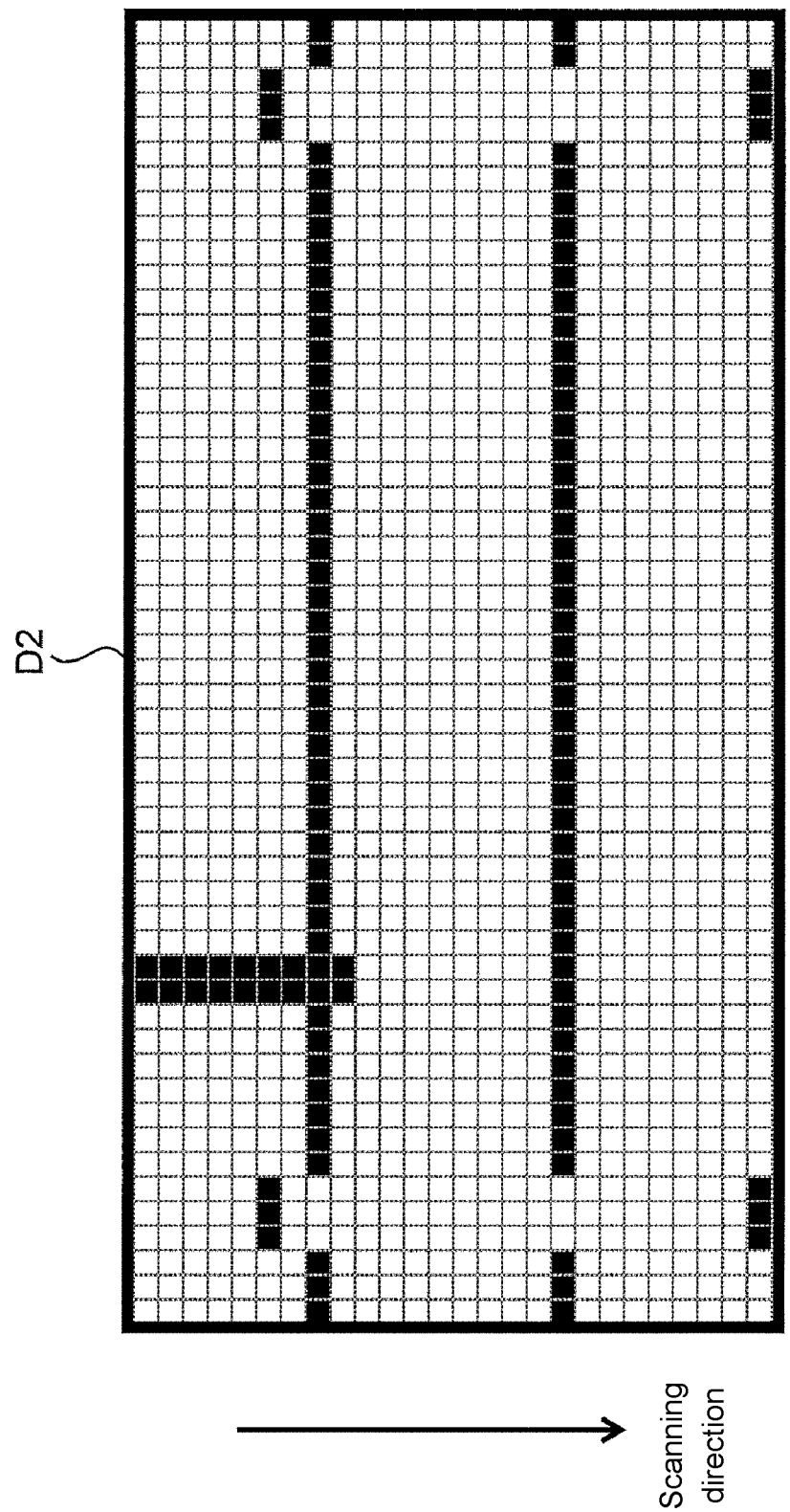
FIG. 9C is a diagram illustrating an example of the second data (Example 3).

The second data D2 for the respective objects O1, O2, and O3 as illustrated in FIGS. 9A to 9C, respectively is generated by executing the method of extracting the second position information (the method of generating the second data D2) described in the aforementioned Steps S501 to S509 on the first data D1 or the third data D3 illustrated in FIGS. 7A, 7B and 6B. FIGS. 9A to 9C are diagrams illustrating examples of the second data.

In this manner, the second data generation unit 153 can extract the plurality of second position information items that represent the contour of the object O at a high speed without using complicated calculation by extracting, as the plurality of second position information items, the two first position information items (the first position information that represents the contour of the lower portion and the contour of the upper portion) that are present at both ends on the same vertical axis (the same y-axis direction) on the first coordinates.

Since the object O1 (human shape) does not include many contour lines in the horizontal direction in second data D2-1 (FIG. 9A) for the object O1, reproducibility of the object shape is lower than those of the other objects. However, in a case in which the processing related to the height of the object O is executed, for example, in the information processing, no problem occurs if the reproducibility of the object shape is not very high as long as the second position information is included in the second data D2 to such an extent to which an upper end and a lower end of the object O1 can be identified as illustrated in FIG. 9A.

In order to reproduce the shape of the object O that does not include many contour lines in the horizontal direction with high reproducibility in the second data D2, it is only necessary to also extract the first position information that indicates the contour in the vertical direction in the first data D1 as the second position information.

Specifically, the second data generation unit 153 may further extract, as the second position information, the first position information items, which do not indicate the contour of the upper portion or the lower portion of the object O, and at least one of which adjacent to each other indicates non-presence of the object O, from among the first position information items with the distances to the detection surface DS that are not the minimum.

For example, it is possible to further extract, as the second position information, the first position information items, at least one of which that are adjacent to each other indicates non-presence of the object O in addition to the first position information that indicates the contour of the upper portion or the lower portion of the object O and the first position information with the minimum distance to the detection surface DS. In that case, the shape of the object O1 that does not include many contour lines in the horizontal direction can be reproduced in the second data D2 as illustrated in FIG. 10, for example.

Figure 10:
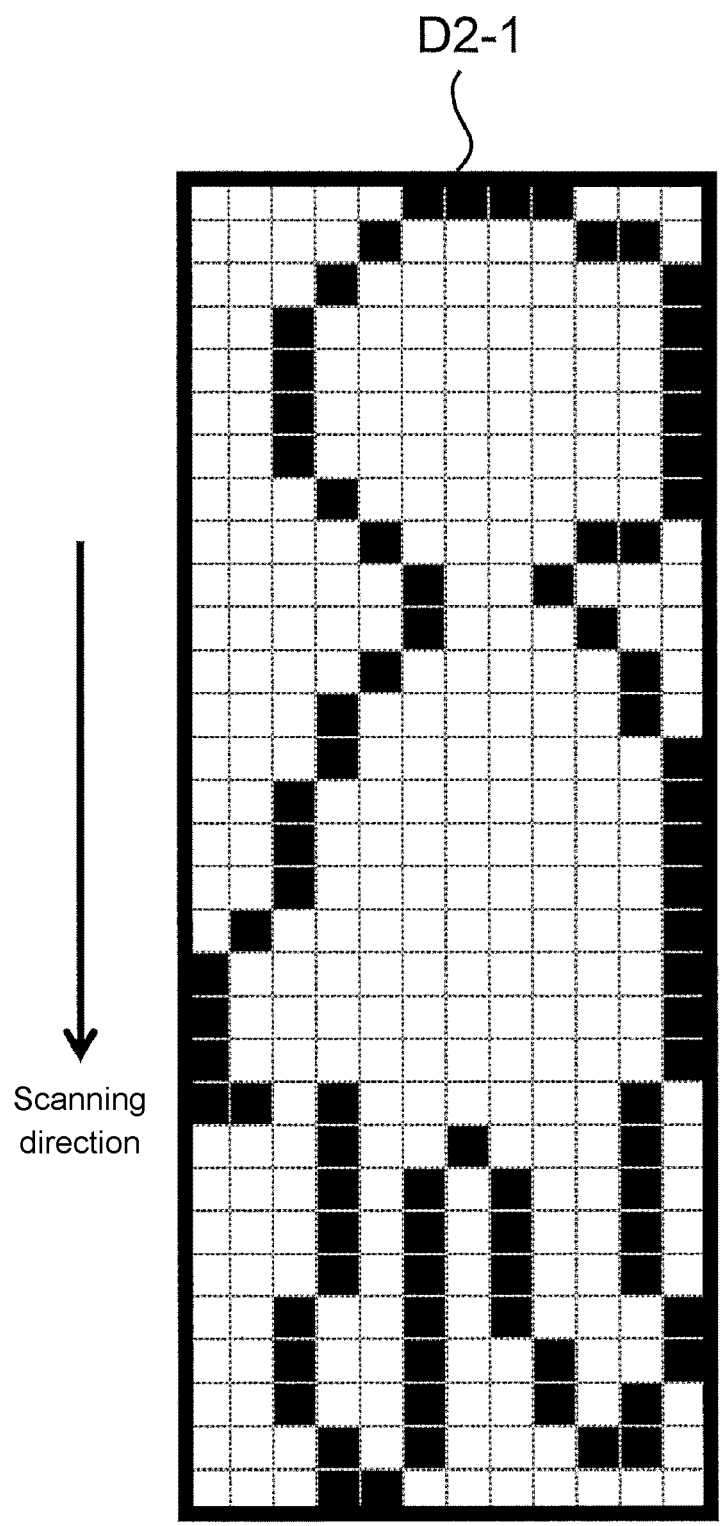
FIG. 10 is a diagram illustrating an example of the second data that has been generated by further extracting first position information, at least one item of which is adjacent and indicates absence of an object, as second position information.

FIG. 10 is a diagram illustrating an example of second data that has been generated by further extracting first position information, at least one of which that are adjacent to each other indicates non-presence of an object, as second position information.

In addition, when the first position information with the minimum distance to the detection surface DS is extracted as the second position information, the second data generation unit 153 extracts, as the second position information, a plurality of first position information items with which the signal detection information that is extremely smaller than an average value of the signal detection information in the surroundings and has a value that is within a predetermined range from a true minimum value is associated.

In this manner, the second data generation unit 153 can appropriately extract only the first position information that indicates the portion sticking out from the object O as the second position information as illustrated in FIGS. 9A to 10. That is, the first position information that indicates small unevenness of the object O is not erroneously detected as the second position information.

The second data generation unit 153 can extract the plurality of second position information items that represent the object O or a part of the object O that is the closest to the object detection device 100 at a high speed without using complicated calculation, by extracting, as the plurality of second position information, the first position information with the minimum distance included in the signal detection information from among the first position information items that are present on the same vertical line on the first coordinates as described above.

(4-3) Information Processing

Figure 11:
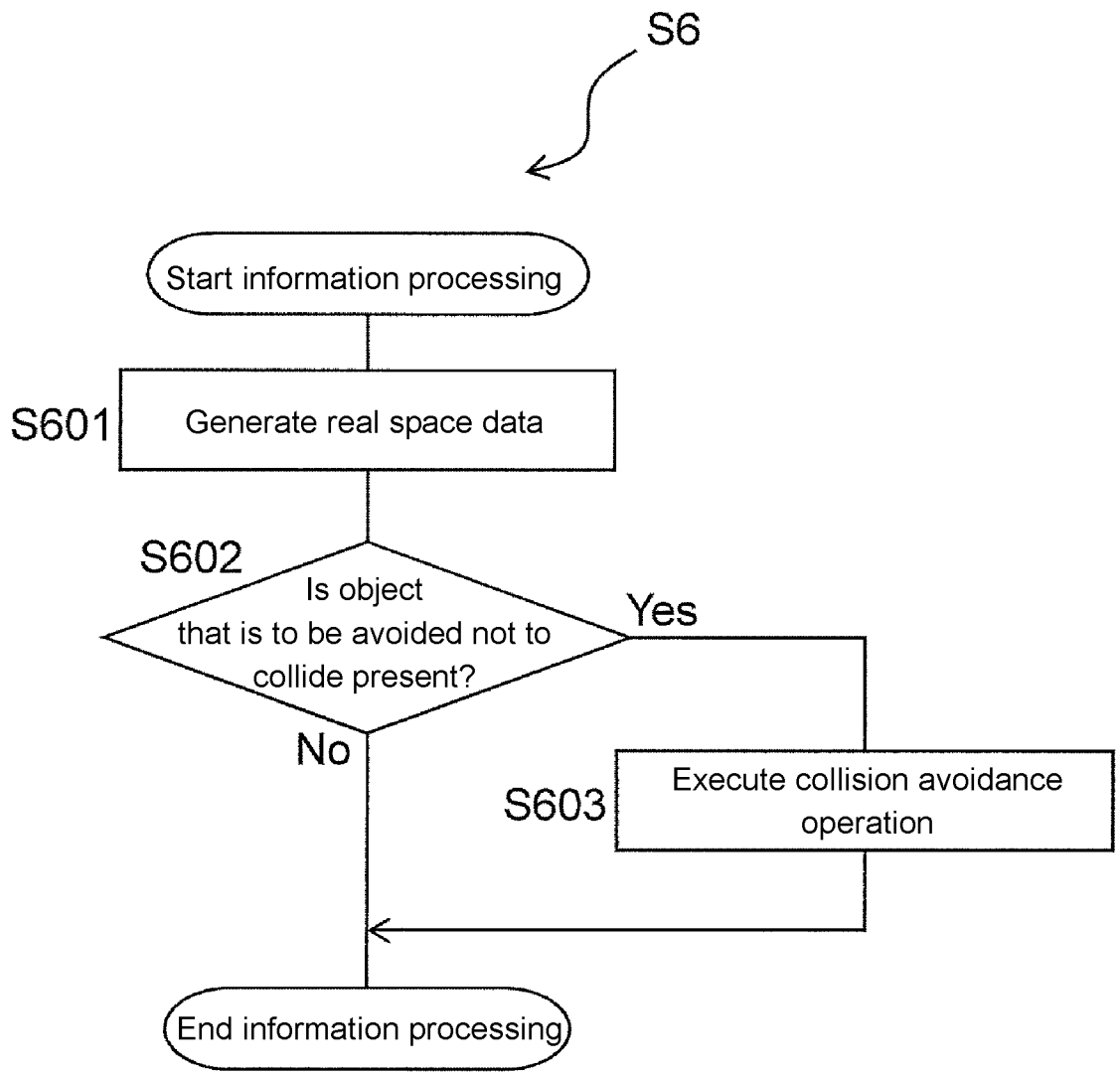
FIG. 11 is a flowchart illustrating a flow of information processing.

Next, the information processing executed in the aforementioned Step S6 will be described with reference to FIG. 11. FIG. 11 is a flowchart illustrating a flow of the information processing. Hereinafter, an example of information processing of controlling a drive mechanism of the moving body system 1 will be described on the basis of the positional relationship determined between the detected object O and the detection surface DS.

If the information processing is started, the real space data generation unit 1541 generates the real space data VD that represents the arrangement position of the detected object O in the real space by using the second data D2 in order to decide the arrangement position of the object O in the real space in which the moving body system 1 moves (Step S601).

Specifically, the real space data generation unit 1541 generates the real space data VD by developing the second position information included in the second data D2 in a real space coordinate system (X-Y-Z coordinates).

If a case in which the p-th second position information (xp, yp, dp) of the second data D2 of the object detection sensor 14a is developed in the X-Y-Z coordinates is exemplified, the real space data generation unit 1541 enlarges the coordinate values (xp, yp) of the first coordinates so as to correspond to coordinate values in the real space and obtains coordinate values (Xp, Yp) of the X-Y coordinates in the real space. The enlargement rate of the coordinate values can be calculated on the basis of distance information dp and a focal distance. In addition, it is possible to eventually calculate the coordinate values (Xp, Yp, Zp) of the object O in the X-Y-Z coordinates on the assumption that dp=Zp. The real space data VD is generated by executing the calculation of the coordinate values on all the second position information items included in the second data D2.

Figure 12:
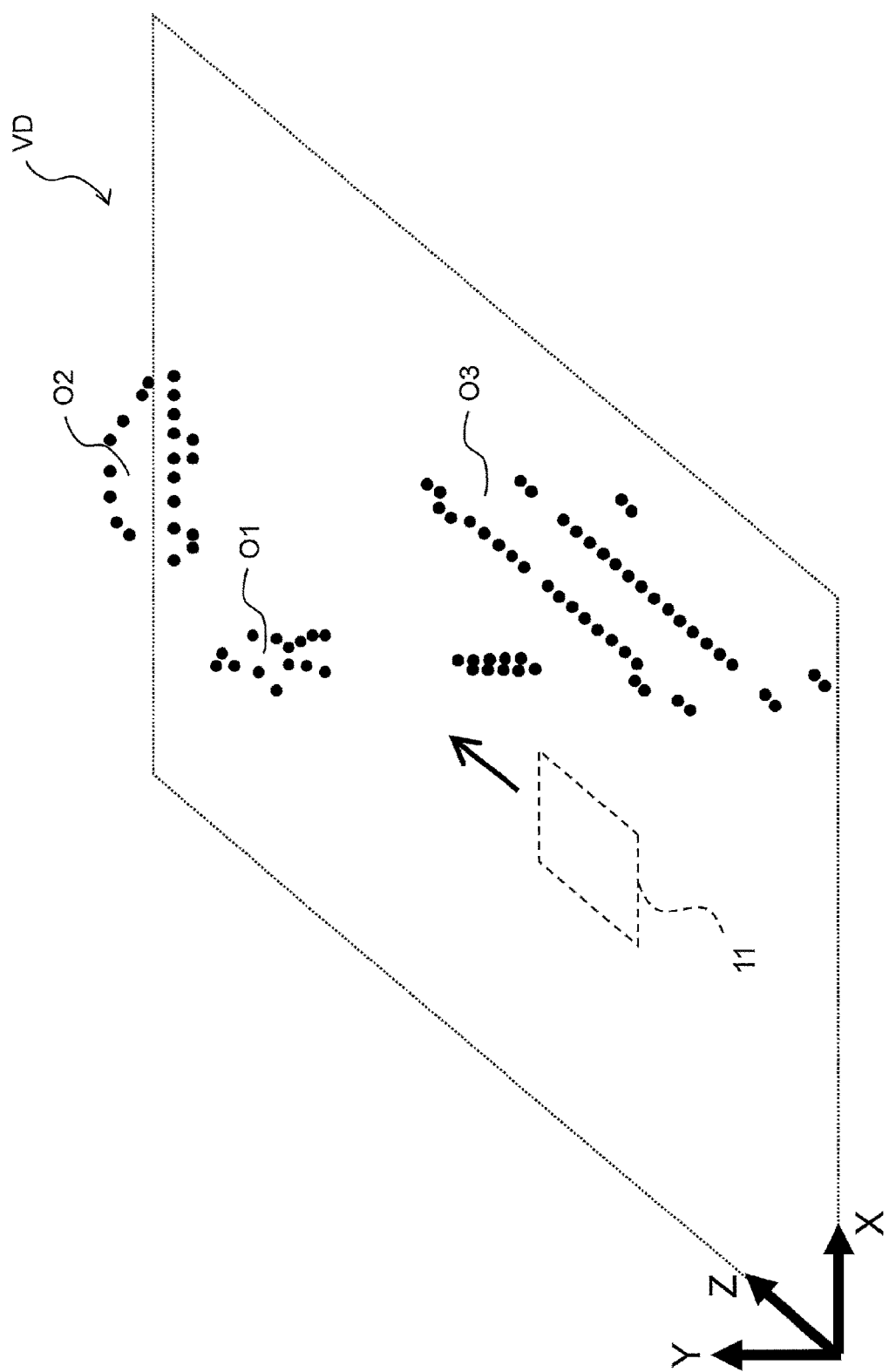
FIG. 12 is a diagram illustrating an example of real space data.

If the real space data VD is generated by using the second data D2 illustrated in FIGS. 9B, 9C, and 10, the real space data VD as illustrated in FIG. 12 is generated. FIG. 12 is an example illustrating an example of the real space data.

As illustrated in FIG. 12, the real space data VD that has been generated from the second data D2 that includes the first position information with the minimum distances to the contour of the object O and the detection surface DS can appropriately reproduce the arrangement positions and the shapes of the objects O1, O2, and O3 and the positions and the shapes of the portions sticking out from the objects that have been detected by the object detection sensors 14a to 14d in the real space coordinates. That is, the measurement accuracy in detecting the object O is not substantially degraded even if the second data D2, the data amount of which is small, is used in the object detection device 100 according to the embodiment.

In the embodiment, the calculation of the coordinate values of the object O in the real space coordinates is executed by using the second data D2 obtained by extracting the data (first position information) that represents the contour of the object O and the data (first position information) with the minimum distance between the object O and the detection surface DS from among the data items obtained by the object detection sensors 14a to 14d. As a result, it is possible to reduce the amount of calculation (the number of times the calculation is repeated) necessary for calculating the coordinate values and to improve the processing speed of the information processing.

After the real space data VD is generated, the real space data output unit 1542 outputs the generated real space data VD to the moving body control unit 13. The moving body control unit 13, to which the real space data VD has been input, determines whether or not the object O is present in the vicinity of the main body 11 (Step S602). Specifically, the moving body control unit 13 determines that the object O is present in the vicinity of the main body 11 (moving body system 1) when the coordinate values within a range of equal to or less than the predetermined distance from the coordinate values of the main body 11 are present inside the real space data VD in the real space data VD.

In a case in which it is determined that the object O is present in the vicinity of the moving body system 1 (in a case of "Yes" in Step S602), the moving body control unit 13 outputs a moving body control command (Step S603). The moving body control command is a command for avoiding collision against the object O by causing the main body 11 to stop before the object O. Specifically, the moving body control unit 13 outputs, as the moving body control signal, a command for applying brake to a brake driving mechanism and/or a command for setting an accelerator position (or an output control mechanism of an engine and/or an electric motor) to zero.

In addition, the moving body control unit 13 may further output a moving body control signal for controlling a steering angle of a steering wheel so as to avoid the object O, for example, and may output a moving body control signal for disconnecting a clutch between an engine and/or an electric motor and the wheels 12a and 12b as needed.

Meanwhile, in a case in which it is determined that the object O is not present in the vicinity of the moving body system 1 (in a case of "No" in Step S602), the moving body control unit 13 ends the control processing of the moving body system 1. In this case, the moving body system 1 can continue to move in accordance with an operation by the driver.

In the aforementioned first embodiment, the information processing unit 154 generates the real space data VD by developing the first position information of all the detected objects O in the real space coordinates. In the moving body system 1, it is not necessary to pay attention to all locations of the object O, it is only necessary to regard only data necessary for determining that the object O is present in the vicinity as a target of processing, and it is possible to shorten the processing time in this manner.

Although all the second position information items (contours) obtained by the second data generation unit 153 are regarded as the second data in the aforementioned first embodiment, it is also effective to regard only the first position information located at the uppermost portion and the first position information located at the lowermost portion as the second data D2 in order to further improve efficiency. If consideration is similarly made, it is also effective to replace the horizontal direction with the vertical direction and to regard only the first position information located at the leftmost position and the first position information located at the rightmost position as the second data D2.

2. Other Embodiments

Although the embodiment of the present invention has been described above, the present invention is not limited to the aforementioned embodiment, and various modifications can be made without departing from the gist of the present invention. In particular, a plurality of embodiments and modification examples described in the specification can be arbitrarily combined as needed.

For example, the order of the second data generation processing in the first embodiment described above is not limited to the order of the processing illustrated in the flowchart of FIG. 8, and the order of the processing can be replaced as needed.

(A) Other Embodiments of Second Data Generation Method

In the aforementioned first embodiment, the second data generation unit 153 decides the first position information to be extracted as the second position information by scanning the first data D1 in the y-axis direction (vertical direction). However, since it is only necessary to be able to extract the first position information that represents the contour of the object O and the first position information with the minimum distance to the detection surface DS, the scanning direction when the first position information to be extracted as the second position information is decided is not limited to the y-axis direction (vertical direction).

For example, the first position information to be extracted may be decided by scanning the first data D1 in the x-axis direction (horizontal direction). In this case, it is possible to extract the first position information that represents a contour extending in the vertical direction (y-axis direction) of the left and right end portions of the object O. In addition, the first position information to be extracted may be decided by scanning the first data D in both the y-axis direction and the x-axis direction.

It is possible to appropriately decide in which direction the first data D1 is to be scanned depending on a basis such as whether it is desired to execute the information processing on the basis of the height of the object O or the length in the horizontal direction.

For example, the processing of extracting two first position information items located at the extreme ends on the first coordinates in a predetermined direction from the first data D1 may be performed in at least one direction.

Figure 13:
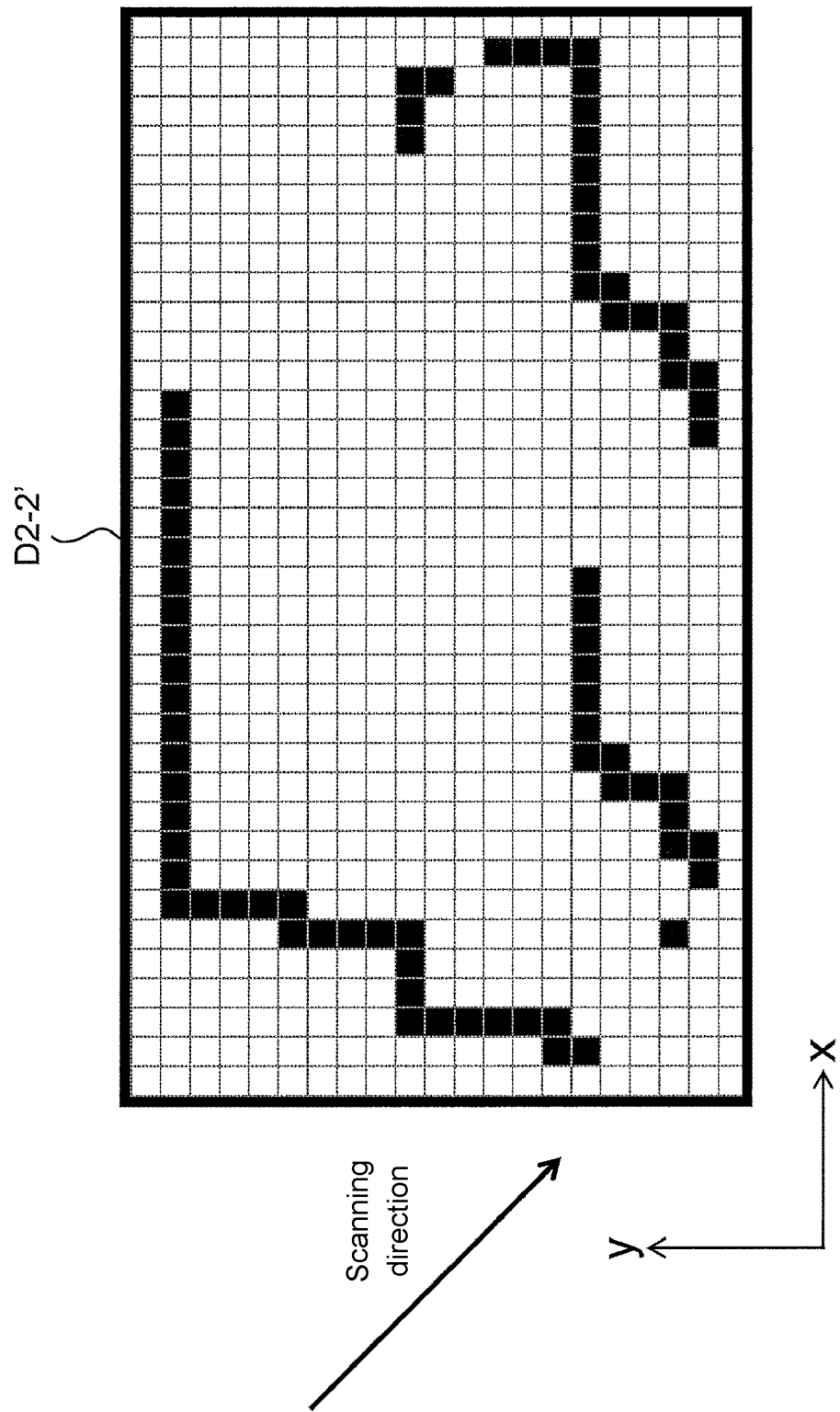
FIG. 13 is a diagram illustrating an example of the second data that is generated by scanning data in a predetermined direction.

If the two first position information items located at the extreme ends are extracted by scanning the third data D3-2 (FIG. 7B) with a car shape from the upper left portion to the lower right portion with an angle of 45° with respect to the vertical direction, for example, second data D2-2' as illustrated in FIG. 13 can be generated. FIG. 13 is a diagram illustrating an example of second data generated by scanning data in a predetermined direction.

In the second data D2-2' illustrated in FIG. 13, contours of the upper left portion and the lower right portion have been able to be mainly extracted as representative points of the car shape. In this manner, it is possible to extract the second position information that represents the contour in the predetermined direction without using complicated calculation by arbitrarily changing the scanning direction of the first data D1 or the third data D3.

In a case in which the first data D1 or the third data D3 is scanned in the predetermined direction as described above, it is possible to extract the first position information (third position information) in an arbitrary direction as the second position information by defining a function that represents the scanning direction at the first coordinates, changing the respective parameters of the function, and using the second position information extracting method in the aforementioned first embodiment.

For example, a function with $y=Ax+B$ defined at the first coordinates can be defined as a function that represents a scanning line of the first data D1 or the third data D3. In this function, inclination A represents the scanning direction of the data, and a segment B causes the scanning line to move in parallel.

It is possible to generate second data D2-2' by changing the X value or the Y value one by one within an allowable value range and scanning the first data D1 or the third data D3 while moving the scanning line in parallel by changing the segment B, for example, in the aforementioned function and extracting two first position information items or two third position information items that are present at the extreme ends on the function as the second position information.

In a case in which the third data D3-2 is scanned from the upper left portion toward the lower right portion with an angle of 45° with respect to the vertical direction as described above, the function that represents the scanning line can be defined as $y=-x+B$ (that is, the inclination A is −1), for example.

Further, in a case in which the moving body system 1 is parked in a parking space, for example, it is necessary to particularly pay attention to the object O that is present on a side or a rear side of the main body 11. In such a case, only the first data D1 obtained from the object detection sensors 14b to 14d attached to both side surfaces and the rear portion of the main body 11 may be used.

In addition, in a case in which the moving body system 1 is parked, it is necessary to pay attention to an object sticking out from a surface of a wall or the like, in particular. Therefore, the second data D2 may be generated by extracting only the first position information with the minimum distance to the detection surface DS and/or extracting the first position information that indicates presence of the object O with the human shape from among the first position information items included in the first data D1.

It is possible to further reduce the amount of data used for the information processing and to improve the processing speed by selecting the object O to be developed in the real space coordinates in accordance with the moving status of the moving body system 1 as described above.

The object detection device can be widely applied to an object detection device that detects an object that is present in the surroundings and executes predetermined processing thereon.

What is claimed is:

1. An object detection device comprising:
   an output unit that outputs a first signal to an object;
   a plurality of detection units that are respectively arranged at predetermined positions on a detection surface and detect a second signal that occurs due to the first signal being reflected by the object;
   a first data generation unit that generates first data that is a group of a plurality of first position information items, in each of which coordinate value and signal detection information are associated, wherein the coordinate values represent the arrangement positions of the plurality of detection units with first coordinates set on the detection surface, and the signal detection information are information calculated on the basis of the second signal detected by the detection units and include at least distance information between the detection surface and the object;

a second data generation unit that generates second data that includes a plurality of second position information items by extracting the plurality of second position information items that are the first position information corresponding to representative points that represent a presence range of the object from the first data; and an information processing unit that executes information processing related to presence of the object by using the second data, wherein the second data generation unit performs, on at least one direction, processing of extracting two first position information items that are located at extreme ends in a predetermined direction on the first coordinates from the first data and extracts the first position information extracted by the processing as the second position information.

2. The object detection device according to claim 1, wherein the representative points are points that represent a contour of the object.

3. The object detection device according to claim 2, wherein the second data generation unit extracts two first position information items that are present at both ends of the same horizontal line or vertical line on the first coordinates as the plurality of second position information items.

4. The object detection device according to claim 1, wherein the representative points are points corresponding to the minimum distance between the object and the detection surface.

5. The object detection device according to claim 1, further comprising:
a third data generation unit that extracts the first position information in which the distance information included in the signal detection information is within a predetermined range in relation to adjacent detection units as third position information from the first data and generates third data that projects one object to the first coordinates,
wherein the second data generation unit extracts the third position information that is included in the third data as the plurality of second position information items.

6. An object detection method, comprising steps of:
outputting a first signal to an object;
detecting, by a plurality of detection units that are respectively arranged at predetermined positions on a detection surface, a second signal that occurs due to the first signal being reflected by the object;
generating first data that is a group of a plurality of first position information items, in each of which coordinate values and signal detection information are associated, wherein the coordinate values represent the arrangement positions of the plurality of detection units with first coordinates set on the detection surface, and the signal detection information are information calculated on the basis of the second signal detected by the detection units and include at least distance information between the detection surface and the object;

generating second data that includes a plurality of second position information items by extracting the plurality of second position information items that are the first position information corresponding to representative points that represent a presence range of the object from the first data;
performing, on at least one direction, processing of extracting two first position information items that are located at extreme ends in a predetermined direction on the first coordinates from the first data and extracting the first position information extracted by the processing as the second position information; and
executing information processing related to presence of the object by using the second data.

7. A program stored on a non-transitory computer readable medium, wherein the program causes a computer to execute the object detection method according to claim 6.

8. The object detection device according to claim 2, further comprising:
a third data generation unit that extracts the first position information in which the distance information included in the signal detection information is within a predetermined range in relation to adjacent detection units as third position information from the first data and generates third data that projects one object to the first coordinates,
wherein the second data generation unit extracts the third position information that is included in the third data as the plurality of second position information items.

9. The object detection device according to claim 3, further comprising:
a third data generation unit that extracts the first position information in which the distance information included in the signal detection information is within a predetermined range in relation to adjacent detection units as third position information from the first data and generates third data that projects one object to the first coordinates,
wherein the second data generation unit extracts the third position information that is included in the third data as the plurality of second position information items.

10. The object detection device according to claim 1, further comprising:
a third data generation unit that extracts the first position information in which the distance information included in the signal detection information is within a predetermined range in relation to adjacent detection units as third position information from the first data and generates third data that projects one object to the first coordinates,
wherein the second data generation unit extracts the third position information that is included in the third data as the plurality of second position information items.

11. The object detection device according to claim 4, further comprising:
a third data generation unit that extracts the first position information in which the distance information included in the signal detection information is within a predetermined range in relation to adjacent detection units as third position information from the first data and generates third data that projects one object to the first coordinates,
wherein the second data generation unit extracts the third position information that is included in the third data as the plurality of second position information items.

* * * * *